United States Patent
Jin et al.

(10) Patent No.: US 11,979,782 B2
(45) Date of Patent: May 7, 2024

(54) METHOD FOR TRANSFER BETWEEN COMMUNICATIONS SYSTEMS AND RELATED DEVICE

(71) Applicant: Huawei Technologies Co., Ltd., Shenzhen (CN)

(72) Inventors: Hui Jin, Beijing (CN); Zhenrong Wei, Shenzhen (CN); Fenghui Dou, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 426 days.

(21) Appl. No.: 17/434,259

(22) PCT Filed: Feb. 21, 2020

(86) PCT No.: PCT/CN2020/076145
§ 371 (c)(1),
(2) Date: Aug. 26, 2021

(87) PCT Pub. No.: WO2020/173397
PCT Pub. Date: Sep. 3, 2020

(65) Prior Publication Data
US 2022/0150778 A1    May 12, 2022

(30) Foreign Application Priority Data
Feb. 27, 2019    (CN) .......................... 201910147001.1

(51) Int. Cl.
*H04W 36/00* (2009.01)
*H04W 36/08* (2009.01)
*H04W 76/10* (2018.01)

(52) U.S. Cl.
CPC ....... *H04W 36/0072* (2013.01); *H04W 36/08* (2013.01); *H04W 76/10* (2018.02)

(58) Field of Classification Search
None
See application file for complete search history.

(56) References Cited

U.S. PATENT DOCUMENTS 8,804,670 B1* 8/2014 Talley ............... H04W 36/0085
370/332
2009/0213809 A1    8/2009 Kwon et al.
(Continued)

FOREIGN PATENT DOCUMENTS

CA    3057183 A1    9/2018
CN    107018542 A    8/2017
(Continued)

OTHER PUBLICATIONS

Zhang, J., et al., "5G mobile/multi-access edge computing integrated architecture and deployment strategy," Telecommunications Science, 2018, Issue 04, 9 pages.
(Continued)

*Primary Examiner* — Otis L Thompson, Jr.
(74) *Attorney, Agent, or Firm* — Conley Rose, P.C.

(57) ABSTRACT

A method for transfer between communications systems includes establishing at least one first data connection channel in a first communications system, selecting at least one second data connection channel from the at least one first data connection channel, where the second data connection channel is included in the first data connection channel and is certain to support transfer from the first communications system to a second communications system or is uncertain whether to support transfer from the first communications system to the second communications system, and transferring the second data connection channel to the second communications system when the terminal device has been transferred from the first communications system to the second communications system.

20 Claims, 6 Drawing Sheets

A terminal device determines that a priority of a fifth PDU session that is used by an app with a high delay requirement and that is in a second PDU session is higher than a priority of a sixth PDU session used by an app with a low delay requirement — 501

The terminal device first transfers the fifth PDU session to a 4G communications system — 502

The terminal device then transfers the sixth PDU session to the 4G communications system — 503

(56) References Cited

U.S. PATENT DOCUMENTS

| | | | | |
|---|---|---|---|---|
| 2013/0244673 | A1* | 9/2013 | Anand | H04W 36/0088 |
| | | | | 455/450 |
| 2015/0264600 | A1* | 9/2015 | Gunasekara | H04W 8/18 |
| | | | | 455/450 |
| 2018/0376384 | A1 | 12/2018 | Youn et al. | |
| 2020/0068449 | A1 | 2/2020 | Jin et al. | |
| 2020/0084659 | A1* | 3/2020 | Pan | H04W 76/15 |

FOREIGN PATENT DOCUMENTS

| | | |
|---|---|---|
| CN | 108401269 A | 8/2018 |
| CN | 109076422 A | 12/2018 |
| CN | 109151929 A | 1/2019 |
| CN | 109391932 A | 2/2019 |
| WO | 2018006017 A1 | 1/2018 |
| WO | 2018171107 A1 | 9/2018 |

OTHER PUBLICATIONS

3GPP TS 23.401 V16.1.0, "3rd Generation Partnership Project; Technical Specification Group Services and System Aspects; General Packet Radio Service (GPRS) enhancements for Evolved Universal Terrestrial Radio Access Network(E-UTRAN) access (Release 16)," Dec. 2018, 411 pages.

3GPP TS 23.502 V15.4.1, "3rd Generation Partnership Project; Technical Specification Group Services and System Aspects; Procedures for the 5G System; Stage 2 (Release 15)," Jan. 2019, 264 pages.

Nokia, et al., "Finalization of Data Forwarding at 4G to 5G Handover," 3GPP TSG-RAN WG3#99, R3-180949, Athens, Greece, Feb. 26-Mar. 2, 2018, 4 Pages.

MediaTek Inc., "Consistent use of 5G Core Network," 3GPP TSG-SA WG2 Meeting #120, S2-171897, Busan, Korea, Mar. 27-Apr. 3, 2017, 11 pages.

Ericsson, "PDU Session ID allocation in EPS," SA WG2 Meeting #121, S2-173323, May 15-19, 2017, Hangzhou, China, 2 pages.

Qualcomm Incorporated, "TS 23.502: Taking UE subscription into account when transfering PDU sessions during 5GC-EPC mobility," 3GPP TSG-SA2 Meeting #127, S2-183238, Sanya, P.R. China, Apr. 16-20, 2018, 10 pages.

QUALCOMM, "Clarification to support of SSC modes for mobility from 5GS to EPC for multi-homed PDU sessions," 82-188037, SA WG2 Meeting #128bis, Aug. 20-24, 2018, Sophia Antipolis, France, 2 pages.

* cited by examiner

METHOD FOR TRANSFER BETWEEN COMMUNICATIONS SYSTEMS AND RELATED DEVICE

CROSS-REFERENCE TO RELATED APPLICATIONS

This is a U.S. National Stage of International Patent Application No. PCT/CN2020/076145 filed on Feb. 21, 2020, which claims priority to Chinese Patent Application No. 201910147001.1 filed on Feb. 27, 2019. All of the aforementioned patent applications are hereby incorporated by reference in their entireties.

TECHNICAL FIELD

This application relates to the database field, and in particular, to a method for transfer between communications systems and a related device.

BACKGROUND

An N26 interface is an interface between a core network entity access and mobility management function (access and mobility management function, AMF) in a fifth generation (5th generation, 5G) transfer communications technology and a core network entity mobility management entity (mobility management entity, MME) in a fourth generation (4th generation, 4G) transfer communications technology. The N26 interface is an optional interface. When the N26 interface does not exist, and a terminal device (also referred to as user equipment (User Equipment. UE)) is transferred (moved or transferred) from a 5G communications system to a 4G communications system, continuity of an IP address may be implemented through handover attach (handover attach).

Specifically, when the UE is transferred from the 5G communications system to the 4G communications system, the UE implements handover attach (handover attach) by using an attach (attach) message that carries an access point name (access point name. APN) and a handover indication, so that the MME can select, for the UE based on the APN, a session management function (session management function. SMF)+a packet data network gateway-control plane (packet data network gateway-control plane, PGW-C) to be used in the 4G communications system. The SMF+PGW-C assigns the UE with an IP address in the 4G communications system that is the same as that m the 5G communications system, thereby ensuring continuity of the internet protocol (internet protocol, IP) address. However, in a handover attach process of the UE, if the MME does not find an SMF+PGW-C corresponding to the APN, the MME rejects the UE, and the UE needs to re-initiate an initial attach (initial attach) process.

When there is no N26 interface, and the UE is transferred from the 5G communications system to the 4G communications system, packet data network (packet data network, PDN) connections in the 4G communications system are established one by one, that is, the UE sequentially transfers protocol data unit (protocol data unit, PDU) sessions (session) established in the 5G communications system to the 4G communications system one by one. Consequently, once the UE selects to transfer a PDU session that does not support interworking (interworking) between communications systems, not only a transfer process fails, but also the UE needs to perform initial attach, and then executes a transfer process of a next PDU session after the attach succeeds. This increases a transfer delay of a PDU session that supports interworking, and also increases a delay of using a transferred data connection channel by the UE, that is, increases a delay of transferring the UE from the 5G communications system to the 4G communications system.

SUMMARY

Embodiments of this application provide a method for transfer between communications systems and a related device, to preferentially transfer a data connection channel that is in a first data connection channel and that is certain to support and/or is uncertain whether to support transfer from a first communications system to a second communications system. In this way, a transfer delay of a data connection channel that supports interworking is shortened, and UE can also transmit data in a timely manner through a data connection channel that has been transferred to the second communications system, thereby reducing a delay of transferring the UE between different communications systems.

According to a first aspect, an embodiment of this application provides a method for transfer between communications systems, where the method includes:

A terminal device establishes at least one first data connection channel in a first communications system, selects at least one second data connection channel from the at least one first data connection channel, and when the terminal device is transferred from the first communications system to a second communications system, preferentially transfers the second data connection channel to the second communications system. The second data connection channel is included in the first data connection channel, is a data connection channel that is certain to support transfer from the first communications system to the second communications system, and/or is a data connection channel that is uncertain whether to support transfer from the first communications system to the second communications system. A data connection channel is a communication channel that is established by the terminal device and that performs a data transmission function, and a data connection channel may be identified by using an IP address and a data network name DNN/access point name APN.

In this application, after obtaining the at least one established first data connection channel, the terminal device determines the second data connection channel from the at least one first data connection channel. The second data connection channel is included in the first data connection channel, is a data connection channel that is certain to support transfer from the first communications system to the second communications system, and/or is a data connection channel that is uncertain whether to support transfer from the first communications system to the second communications system. The terminal device preferentially transfers a data connection channel that is in the first data connection channel and that is certain to support and/or is uncertain whether to support transfer from the first communications system to the second communications system, that is, delays processing of a data connection channel that is certain not to support transfer between communications systems. Therefore, a transfer delay of a data connection channel that supports interworking is shortened, and the UE can also transmit data in a timely manner through a data connection channel that has been transferred to the second communications system, thereby reducing a delay of transferring the UE from the first communications system to the second communications system.

In a possible implementation, a manner in which the terminal device selects at least one second data connection channel from the at least one first data connection channel includes any one or a combination of a plurality of the following items:

Description information of each first data connection channel may be pre-stored on the terminal device. The description information may include a session and service continuity mode of each first data connection channel and/or a DNN/APN of each first data connection channel. Therefore, the terminal device can determine a network access manner of each first data connection channel based on the DNN/APN of the first data connection channel, and select the second data connection channel from the first data connection channel based on the network access manner of each first data connection channel. Alternatively, the terminal device selects the second data connection channel from the first data connection channel based on the session and service continuity mode of each first data connection channel.

In this application, all the first data connection channels established by the UE are classified based on the description information that is of each first data connection channel and that is stored on the UE, to determine the second data connection channel. The UE may complete an operation of selecting the second data connection channel from the first data connection channel by fully using the information that has been stored on the terminal, thereby avoiding causing an additional burden on a network side device, and improving an implementation possibility of this solution.

In a possible implementation, that the terminal device selects at least one second data connection channel from the at least one first data connection channel includes: The terminal device selects, from the first data connection channel, at least one third data connection channel that is certain to support transfer from the first communications system to the second communications system, where the third data connection channel is included in the second data connection channel; and a manner in which the terminal device selects, from the first data connection channel, a third data connection channel that is certain to support transfer from the first communications system to the second communications system includes any one or a combination of a plurality of the following items:

The terminal device selects the third data connection channel from the first data connection channel, where the third data connection channel includes a data connection channel through which the terminal device has received information sent by a core network entity in the second communications system during data connection channel establishment; or the terminal device selects the third data connection channel from the first data connection channel, where the third data connection channel includes a data connection channel transferred from the second communications system to the first communications system.

In this application, in a data connection channel creation process, the data connection channel through which a message has been received from the second communications system is determined as a data connection channel that supports transfer from the first communications system to the second communications system, and/or the data connection channel transferred from the second communications system is determined as a data connection channel that supports transfer from the first communications system to the second communications system. In the foregoing two determining manners, it may be ensured that a selected data connection channel is definitely the data connection channel that supports transfer from the first communications system to the second communications system, thereby improving accuracy of a determining process. In addition, a determining basis is a historical message received by the UE, so that the solution is simple and easy to operate.

In a possible implementation, that the terminal device preferentially transfers the second data connection channel to the second communications system includes: When the second data connection channel includes at least two data connection channels, the terminal device prioritizes the at least two second data connection channels, and transfers the at least two second data connection channels to the second communications system based on a prioritization result, where a data connection channel with a higher priority is transferred earlier from the first communications system to the second communications system by the terminal device.

In this application, because data connection channels are transferred to the second communications system one by one, the at least two second data connection channels are prioritized, to ensure that a data connection channel with a higher priority can be transferred earlier to the second communications system by the terminal device, so that the terminal device can perform prioritization based on use statuses of the data connection channels, thereby improving flexibility of a data connection channel transfer process.

In a possible implementation, the second data connection channel includes at least one third data connection channel and at least one fourth data connection channel, the third data connection channel is a data connection channel that is certain to support transfer from the first communications system to the second communications system, and the fourth data connection channel is a data connection channel that is uncertain whether to support transfer from the first communications system to the second communications system.

That the terminal device prioritizes the at least two second data connection channels includes: The terminal device determines that a priority of the third data connection channel is higher than a priority of the fourth data connection channel.

That the terminal device transfers the at least two second data connection channels to the second communications system based on a prioritization result includes: The terminal device first transfers the third data connection channel to the second communications system, and then the terminal device transfers the fourth data connection channel to the second communications system.

In this application, the at least two second data connection channels are further sorted based on whether the second data connection channel is certain to support transfer from the first communications system to the second communications system, so that a data connection channel that is certain to support transfer from the first communications system to the second communications system has a highest priority, and is transferred earliest, that is, the data connection channel that is transferred earliest can be definitely transferred successfully through handover attach. Therefore, it is ensured that the UE can transmit data in a short time through the data connection channel that is successfully transferred, thereby further shortening a transfer delay of transferring the UE from the first communications system to the second communications system.

In a possible implementation, each data connection channel included in the at least two second data connection channels is used by at least one application program app. When the third data connection channel includes at least two data connection channels, that the terminal device prioritizes the at least two second data connection channels further includes: The terminal device determines that a priority of a data connection channel that is used by an app with a high delay requirement and that is in the third data connection channel is higher than a priority of a data connection channel used by an app with a low delay requirement; and/or when the fourth data connection channel includes at least two data connection channels, that the terminal device prioritizes the at least two second data connection channels further includes: The terminal device determines that a priority of a data connection channel that is used by an app with a high delay requirement and that is in the fourth data connection channel is higher than a priority of a data connection channel used by an app with a low delay requirement. The two concepts of the app with the high delay requirement and the app with the low delay requirement are not absolute concepts, but are relative concepts obtained by comparing delay requirement information of two apps.

In this application, the third data connection channel and the fourth data connection channel may be further respectively sorted by using the delay requirement information of the app, so that not only sorting of the data connection channels is more accurate and operability of this solution is improved, but also it is ensured that the data connection channel used by the app with the high delay requirement can be preferentially transferred, to provide a smoother service to a user.

In a possible implementation, each data connection channel included in the at least two second data connection channels is used by at least one application program app. That the terminal device prioritizes the at least two second data connection channels includes: The terminal device determines that a priority of a fifth data connection channel that is used by an app with a high delay requirement and that is in the second data connection channel is higher than a priority of a sixth data connection channel used by an app with a low delay requirement.

That the terminal device transfers the at least two second data connection channels to the second communications system based on a prioritization result includes: The terminal device first transfers the fifth data connection channel to the second communications system, and then the terminal device transfers the sixth data connection channel to the second communications system.

In this application, because the app with the high delay requirement is usually an app that is easily perceived by a user, the at least two second data connection channels are sorted by using the delay requirement information of the app. Therefore, it is ensured that the data connection channel used by the app with the high delay requirement can be preferentially transferred, thereby avoiding poor experience brought to the user because the UE is transferred between communications systems, to provide a better service.

In a possible implementation, when the fifth data connection channel includes at least two data connection channels, that the terminal device prioritizes the at least two second data connection channels further includes: The terminal device determines that a priority of a data connection channel that is in the fifth data connection channel and that is certain to support transfer from the first communications system to the second communications system is higher than a priority of a data connection channel that is uncertain whether to support transfer from the first communications system to the second communications system; and/or when the sixth data connection channel includes at least two data connection channels, that the terminal device prioritizes the at least two second data connection channels further includes: The terminal device determines that a priority of a data connection channel that is in the sixth data connection channel and that is certain to support transfer from the first communications system to the second communications system is higher than a priority of a data connection channel that is uncertain whether to support transfer from the first communications system to the second communications system.

In this application, the fifth data connection channel and the sixth data connection channel may be further respectively sorted based on whether the data connection channel is certain to support transfer from the first communications system to the second communications system, so that a transfer operation can be preferentially performed on the data connection channel that is certain to support transfer from the first communications system to the second communications system, to improve a success rate of a data connection channel transfer operation in an early stage. Therefore, the UE can transmit data through a data connection channel, as early as possible, that is successfully transferred to the second communications system.

In a possible implementation, the terminal device includes a modem processor and an application processor, and each data connection channel included in the at least two second data connection channels is used by at least one first app.

That the terminal device prioritizes the at least two second data connection channels includes: The modem processor obtains a correspondence between the second data connection channel and the first app and delay requirement information of each first app from the application processor, and prioritizes the at least two second data connection channels based on the correspondence between the second data connection channel and the first app and the delay requirement information of each first app.

In this application, after obtaining the correspondence and the delay requirement information of the first app, the modem processor may prioritize the at least two second data connection channels in a timely manner, thereby improving a speed of a process of prioritizing the at least two second data connection channels.

In a possible implementation, the terminal device includes a modem processor and an application processor, and each data connection channel included in the at least two second data connection channels is used by at least one first app.

That the terminal device prioritizes the at least two second data connection channels includes: The application processor obtains identifier information of the at least two second data connection channels from the modem processor. After obtaining the identifier information of the at least two second data connection channels, the application processor may determine a correspondence between each second data connection channel and the first app, may prioritize the at least two second data connection channels based on the correspondence between the second data connection channel and the first app and delay requirement information of each first app, to obtain a prioritization result of at least two second PDU sessions, and may feed back the prioritization result of the at least two second PDU sessions to the modem processor.

In this application, after determining which data connection channel is included in the second data connection channel, the application processor prioritizes the at least two second data connection channels, so that the modem processor does not need to know the correspondence between the second data connection channel and the first app, thereby reducing processing load of the modem processor.

In a possible implementation, the method further includes: When the terminal device determines that a seventh data connection channel exists in the first data connection channel, and the terminal device is transferred from the first communications system to the second communications system, the seventh data connection channel is not transferred to the second communications system, where the seventh data connection channel is included in the first data connection channel, and is a data connection channel that is certain not to support transfer from the first communications system to the second communications system.

In this application, because an operation of transferring the seventh data connection channel to the second communications system definitely fails, either re-establishing a data connection channel in the second communications system through initial attach or binding a second app that uses the seventh data connection channel to a data connection channel that has been transferred to the second communications system avoids a time wasted because the data connection channel transfer operation fails, thereby further shortening a transfer delay of transferring the UE from the first communications system to the second communications system.

In a possible implementation, the method further includes: The terminal device obtains at least one second app that uses the seventh data connection channel, and determines a correspondence between the second app and a data connection channel that has been transferred to the second communications system, to transmit data of the second app through the data connection channel that has been transferred to the second communications system.

In this application, the at least one second app that uses the seventh data connection channel is directly bound to the data connection channel that has been transferred to the second communications system, to transmit data through the data connection channel that has been transferred to the second communications system, thereby omitting a process in which the UE establishes a data connection channel in the second communications system through initial attach, and further shortening a transfer delay of transferring the UE from the first communications system to the second communications system.

In a possible implementation, the first communications system is a fourth generation communications network, the second communications system is a fifth generation communications system, and the first data connection channel is a packet data network PDN connection. Alternatively, the first communications system is a fifth generation communications system, the second communications system is a fourth generation communications network, and the first data connection channel is a protocol data unit PDU session.

In this application, not only a specific implementation solution for transfer from a 5G communications system to a 4G communications system is provided, but also a specific implementation solution for transfer from the 4G communications system to the 5G communications system is provided, thereby expanding an implementation scenario of this solution, and improving comprehensiveness of this solution.

According to a second aspect, an embodiment of this application provides a terminal device, where the terminal device may include an establishment unit, a selection unit, and a transfer unit.

The establishment unit is configured to establish at least one first data connection channel in a first communications system. The selection unit is configured to select at least one second data connection channel from the at least one first data connection channel, where the second data connection channel is included in the first data connection channel, is a data connection channel that is certain to support transfer from the first communications system to a second communications system, and/or is a data connection channel that is uncertain whether to support transfer from the first communications system to the second communications system. The transfer unit is configured to: when the terminal device is transferred from the first communications system to the second communications system, preferentially transfer the second data connection channel to the second communications system.

In the second aspect of this application, composition modules of the terminal device may further perform the steps described in the first aspect and the possible implementations. For details, refer to the descriptions in the first aspect and the possible implementations.

According to a third aspect, an embodiment of this application provides a terminal device, where the terminal device may include a processor, and the processor may include a modem processor.

The modem processor is configured to establish at least one first data connection channel in a first communications system. The modem processor is further configured to select at least one second data connection channel from the at least one first data connection channel, where the second data connection channel is included in the first data connection channel, is a data connection channel that is certain to support transfer from the first communications system to a second communications system, and/or is a data connection channel that is uncertain whether to support transfer from the first communications system to the second communications system. The modem processor is further configured to: when the terminal device is transferred from the first communications system to the second communications system, preferentially transfer the second data connection channel to the second communications system.

In the third aspect of this application, composition modules of the terminal device may further perform the steps described in the first aspect and the possible implementations. For details, refer to the descriptions in the first aspect and the possible implementations.

According to a fourth aspect, an embodiment of this application provides a modem processor, configured to perform the steps performed by the modem processor in the third aspect and the possible implementations. For details, refer to the descriptions in the third aspect and the possible implementations.

According to a fifth aspect, an embodiment of this application provides a computer program product including an instruction for transfer between communications systems. When the computer program product is run on a computer, the computer is enabled to perform the method in the first aspect.

According to a sixth aspect, an embodiment of this application provides a computer readable storage medium. The computer readable storage medium stores computer program code. When the computer program code is run on a computer, the computer is enabled to perform the method in the first aspect.

For beneficial effects of the second aspect to the sixth aspect of this application, refer to the first aspect.

DESCRIPTION OF EMBODIMENTS

Embodiments of this application provide a method for transfer between communications systems and a related device, to preferentially transfer a data connection channel that is in a first data connection channel and that is certain to support and/or is uncertain whether to support transfer from a first communications system to a second communications system. In this way, a transfer delay of a PDU session that supports interworking is shortened, and UE can also transmit data in a timely manner through a data connection channel that has been transferred to the second communications system, thereby reducing a delay of transferring the UE between different communications systems.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The following describes the embodiments of this application with reference to accompanying drawings.

Figure 1:
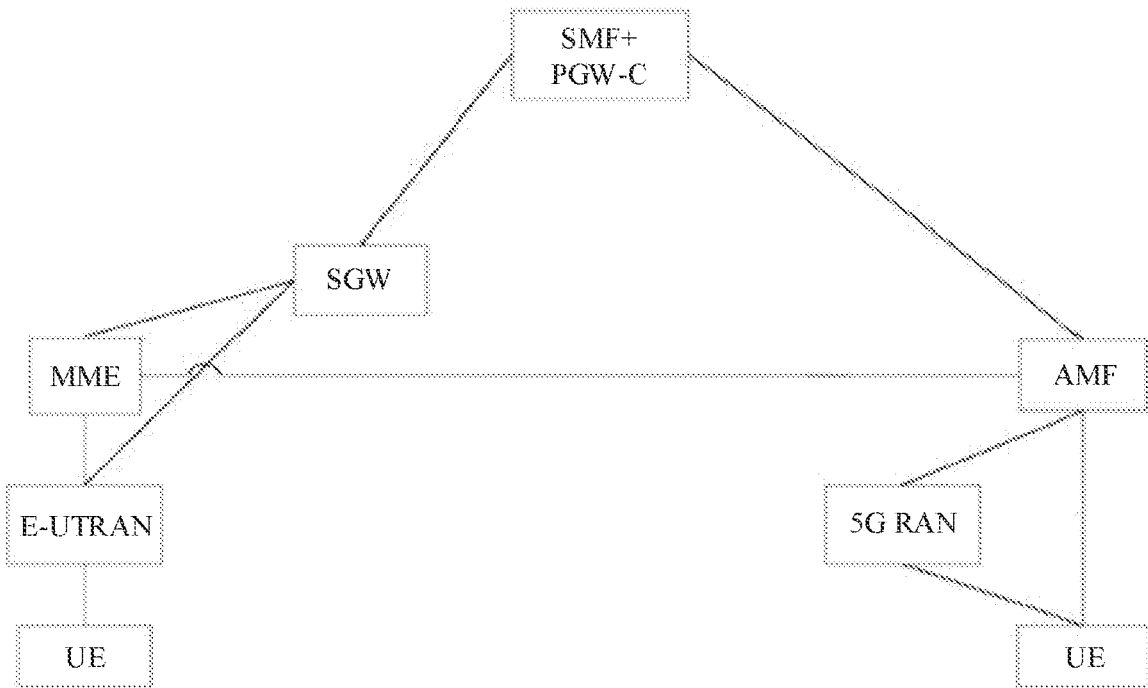
FIG. 1 is a schematic structural diagram of a communications system according to an embodiment of this application.

FIG. 1 is a schematic diagram of an application scenario of a method for transfer between communications systems according to an embodiment of this application. The application scenario diagram shows a communications system combining 4G and 5G. The communications system includes UE, an evolved UMTS terrestrial radio access network (evolved UMTS terrestrial radio access network, E-UERAN), an MME, a session management function (session management function, SMF)+a PDN gateway-control plane (PDN Gateway-Control plane, PGW-C), an AMF, and a 5G radio access network (5G Radio Access Network, 5G-RAN).

The E-UTRAN is a 4G-side base station, and the UE may access a 4G communications system via the base station. The 5G-RAN is a 5G-side base station, and the UE may access a 5G communications system via the base station. The 5G-RAN may be a base station that is obtained after the E-UTRAN is further evolved, where the UE can access the 5G communications system via the base station, or the 5G-RAN may be a base station that is specially used by the UE to access the 5G communications system.

A core network entity in FIG. 1 may also be referred to as a core network device. Specifically, the MME is a 4G core network device, and is responsible for performing authentication, authorization, mobility management, and session management on the UE. An SGW is a 4G core network device (a core network gateway), and is responsible for forwarding data, storing downlink data, and the like.

The SMF+PGW-C is a core network device shared by 4G and 5G, namely, a core network device integrated with 4G and 5G, and includes a function of an SMF and a function of a PGW-C. The SMF is a control plane device in a 5G core network, provides a control plane service to a PDU session of the UE, is specifically configured to manage a 5G PDU session, and is responsible for assigning an IP address to the UE. The PGW-C is a control plane device in a 4G core network, provides a control plane service to a PDN connection of the UE, is specifically configured to manage a 4G PDN connection, and is responsible for assigning an IP address to the UE. The SMF+PGW-C may also be referred to as a PGW-C+SMF, provided that a device including the function of the SMF and the function of the PGW-C is the same as this device.

The AMF is a 5G core network device, and is configured to authenticate and authorize the UE and manage mobility of a user.

An N26 interface may exist between the MME and the AMF. Currently, the N26 interface is optional. When the N26 interface does not exist, and the UE is transferred from the 4G communications system to the 5G communications system, the UE needs to send an existing (existing) PDU session instruction to the MME to implement seamless transfer from the 4G communications system to the 5G communications system. When the N26 interface does not exist, and the UE is transferred from the 5G communications system to the 4G communications system, the UE needs to send an attach handover instruction to the AMF to implement seamless transfer from the 5G communications system to the 4G communications system. Seamless transfer means that the IP address remains unchanged and/or the SMF+PGW-C remains unchanged.

The method for transfer between communications systems provided in the embodiments of this application may be applied to the UE in FIG. 1. The UE may be a mobile phone, a tablet computer (tablet personal computer), a laptop computer (laptop computer), a digital camera, a personal digital assistant (personal digital assistant, PDA for short), a navigation apparatus, a mobile internet device (mobile internet device, MID), a wearable device (wearable device), a smartwatch, a smart band, and the like. Alternatively, the UE may be a communication chip or the like in the foregoing plurality of communications apparatuses. Certainly, a specific form of the terminal device is not limited in the following embodiments. A system that can be installed on the terminal device may include iOS®, Android®, Microsoft®, Linux®, or another operating system. This is not limited in the embodiments of this application.

Figure 2:
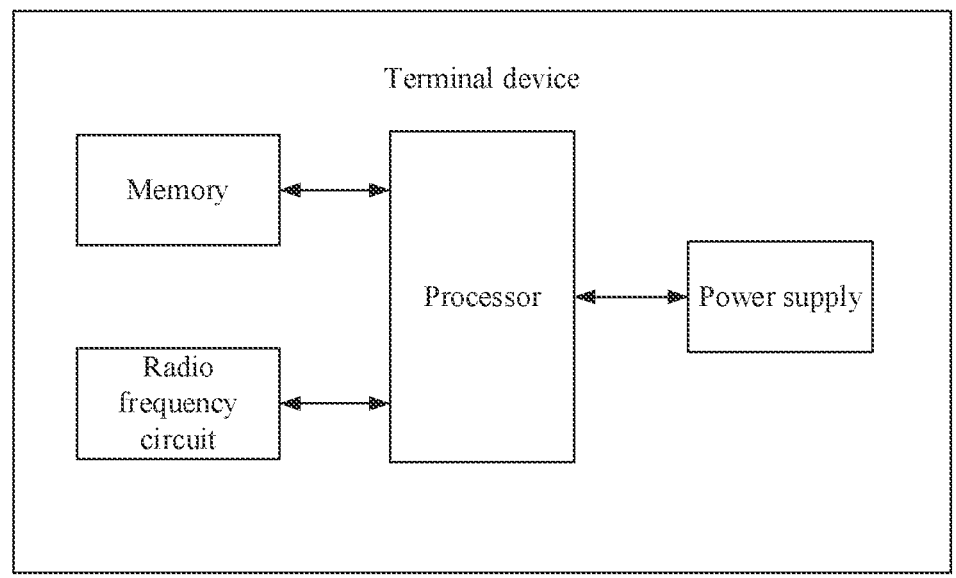
FIG. 2 is a schematic structural diagram of a terminal device according to an embodiment of this application.

Specifically, FIG. 2 is a schematic structural diagram of UE according to an embodiment of this application. The UE may include components such as a memory, a processor, a radio frequency (Radio Frequency, RF) circuit, and a power supply. The memory may be configured to store a software program and a module. The processor performs various function applications of the UE and data processing by running the software program and the module that are stored in the memory.

Specifically, the memory may mainly include a program storage area and a data storage area. The program storage area may store an operating system, an application program required by at least one function, and the like. The data storage area may store data created based on use of the UE, and the like. In addition, the memory may include a high-speed random access memory, and may further include a nonvolatile memory and the like. The processor is a control center of the UE, and is connected to all parts of the entire UE by using various interfaces and lines. By running or executing the software program and/or the module stored in the memory, and invoking data stored in the memory, the processor performs various functions of the UE and data processing, to perform overall monitoring on the UE. Optionally, an application processor and a modem processor may be integrated into the processor. The application processor mainly processes an operating system, a user interface, an application program, and the like. The modem processor mainly processes wireless communication. The radio frequency circuit may be configured to receive and send information, or receive and send a signal during a call. The radio frequency circuit includes but is not limited to an antenna, at least one amplifier, a transceiver, a coupler, an LNA (low noise amplifier, low noise amplifier), a duplexer, and the like. The UE further includes the power supply that supplies power to each component. The power supply may be logically connected to the processor by using a power management system, to implement functions such as charging management, discharging management, and power consumption management by using the power management system.

Although not shown, the UE may further include an input unit, a display unit, a sensor module, an audio module, a Wi-Fi module, a Bluetooth module, and the like. Details are not described herein.

In this embodiment of this application, when the UE is transferred from a first communications system to a second communications system, at least one first data connection channel established by the UE in the first communications system needs to be transferred to the second communications system. Because the UE transfers the first data connection channels to the second communications system one by one, when the UE transfers a data connection channel that does not support transfer from the first communications system to the second communications system, not only a current data connection channel transfer operation fails, but also re-attachment needs to be performed. Consequently, a relatively long time is consumed. To enable the UE to transmit data through a data connection channel, as early as possible, that is transferred to the second communications system the UE may select a second data connection channel from the at least one established first data connection channel, and preferentially transfer the second data connection channel to the second communications system, so that the UE can transmit data through a data connection channel, as early as possible, that is successfully transferred, to shorten a delay of transferring the UE from the first communications system to the second communications system. It should be understood that preferentially transferring the second data connection channel includes first transferring the second data connection channel to the second communications system, and also includes transferring only the second data connection channel to the second communications system.

When the first communications system is a 5G communications system, and the second communications system is a 4G communications system, the first data connection channel is a PDU session. When the first communications system is a 4G communications system, and the second communications system is a 5G communications system the first data connection channel is a PDN connection. In the two scenarios in which the UE is transferred from the 5G communications system to the 4G communications system and the UE is transferred from the 4G communications system to the 5G communications system specific implementations of this solution are slightly different. The following separately describes the foregoing two scenarios in detail.

1. The UE is transferred from the 5G communications system to the 4G communications system.

Figure 3:
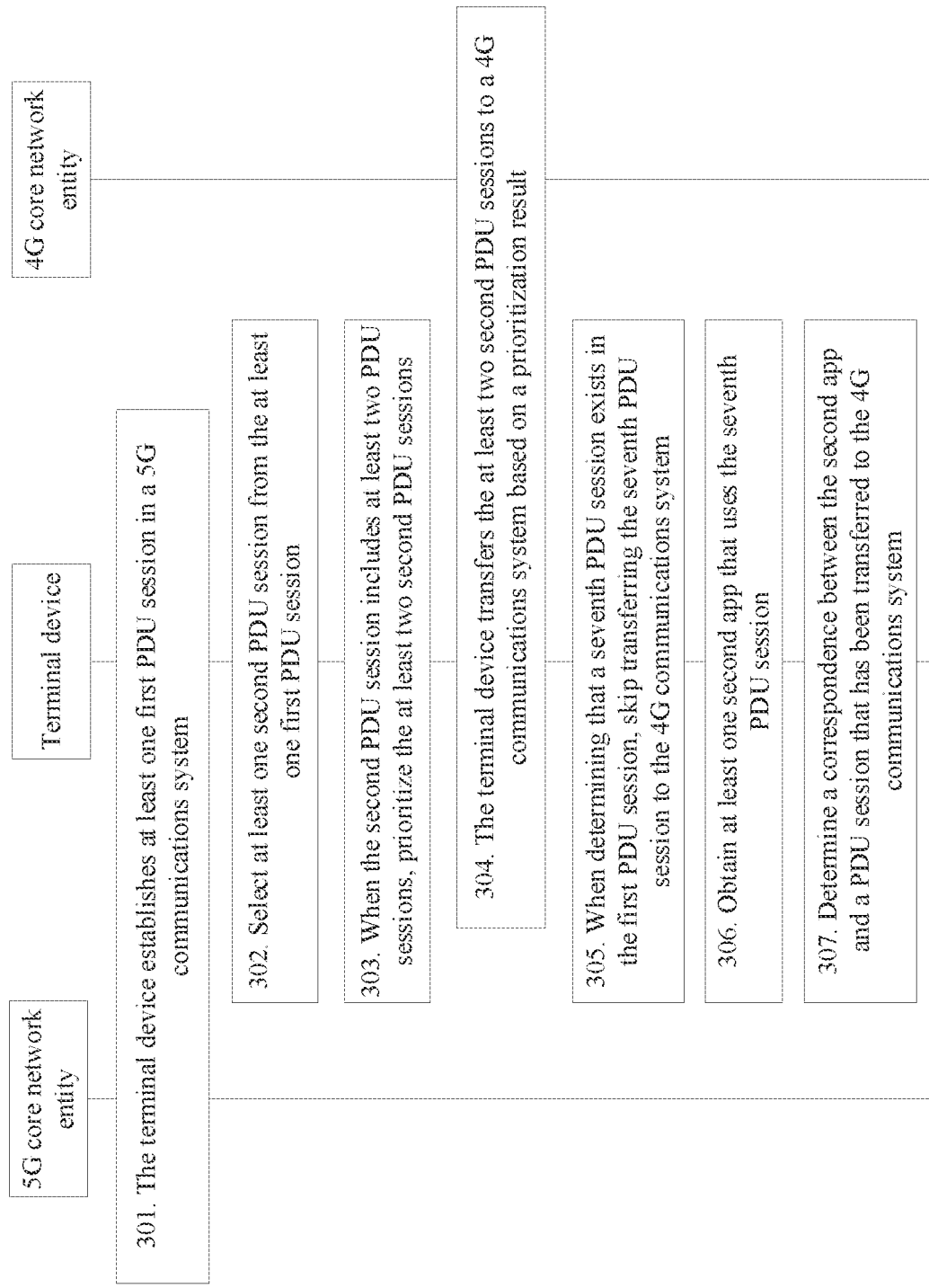
FIG. 3 is a schematic flowchart of a method for transfer between communications systems according to an embodiment of this application.

FIG. 3 is a schematic flowchart of a method for transfer between communications systems according to an embodiment of this application. The method may include the following steps.

301. The UE establishes at least one first PDU session in the 5G communications system.

In this embodiment of this application, the PDU session may be defined as a combination of a group of quality of service (quality of service. QoS) flows (flow) established on the UE in the 5G communications system. The first PDU session is all PDU sessions established on the UE. QoS flows included in a PDU session have a same IP address and data network name (data network name, DNN), that is, a PDU session may be identified by using an IP address and a DNN.

In this embodiment of this application, for a specific implementation in which the UE establishes the at least one first PDU session in the 5G communications system, refer to the prior art. Details are not described herein again.

302. The UE selects at least one second PDU session from the at least one first PDU session.

In this embodiment of this application, the second PDU session is included in the first PDU session, is a PDU session that is certain to support transfer from the 5G communications system to the 4G communications system, and/or is a PDU session that is uncertain whether to support transfer from the 5G communications system to the 4G communications system.

In this embodiment of this application, description information of all PDU sessions included in the at least one first PDU session is recorded on the UE. The description information of each PDU session includes at least identifier information of the PDU session, may further include a DNN or a session and service continuity (session and service continuity, SSC) mode (mode), and may further include description information of another type such as a session type of the PDU session. Details are not described one by one herein.

In this embodiment of this application, the UE may select the at least one second PDU session from the at least one first PDU session based on the description information of each first PDU session in the stored description information of all the first PDU sessions. Specifically, a manner in which the UE selects a second PDU session from the first PDU session includes but is not limited to any one or a combination of a plurality of the following items:

The UE selects the second PDU session from the first PDU session based on a network access manner of each first PDU session; or the UE selects the second PDU session from the first PDU session based on a session and service continuity mode of each first PDU session.

In this embodiment of this application, the UE may determine a network access manner of a PDU session based on a DNN of the PDU session. The network access manner of the PDU session includes but is not limited to an IP multimedia subsystem (IP multimedia subsystem, IMS), an internet (Internet), a local area data network (local area data network, LAND), and the like. Details are not listed one by one herein.

In some embodiments of this application, after obtaining the description information of each first PDU session, the UE may obtain the DNN of each first PDU session, to obtain the network access manner of each first PDU session, and classify all the first PDU sessions based on the network access manner of each first PDU session, to select the second PDU session. Specifically, when the UE determines, based on the DNN, that the network access manner of the PDU session is the IMS, the PDU session is a PDU session that is certain to support transfer from the 5G communications system to the 4G communications system. When the UE determines, based on the DNN, that the network access manner of the PDU session is the internet, the PDU session is a PDU session that is uncertain whether to support transfer from the 5G communications system to the 4G communications system. When the UE determines, based on the DNN, that the network access manner of the PDU session is the LAND, the PDU session is a PDU session that is certain not to support transfer from the 5G communications system to the 4G communications system. It should be understood that another type of DNN may be used to indicate another type of network access manner. The examples herein are merely intended to prove implementability of this solution, and a type of the DNN is not specifically limited.

In some other embodiments of this application, after obtaining the description information of each first PDU session, the UE may obtain the SSC mode of each first PDU session, and classify all the first PDU sessions based on the SSC mode of each first PDU session, that is, determine, based on the SSC mode of each first PDU session, whether the PDU session supports transfer from the 5G communications system to the 4G communications system, to select the second PDU session. Specifically, when the SSC mode of the PDU session is an SSC mode 2 or an SSC mode 3, the PDU session is a PDU session that is certain not to support transfer from the 5G communications system to the 4G communications system. When the SSC mode of the PDU session is an SSC mode 1, the PDU session is a PDU session that is uncertain whether to support transfer from the 5G communication system to the 4G communication system. It should be understood that the SSC mode of the PDU session may be of another type. The examples herein are merely intended to prove implementability of this solution, and a type of the SSC mode is not specifically limited.

In still some other embodiments of this application, after obtaining the description information of each first PDU session, the UE may classify all the first PDU sessions based on both the DNN and the SSC mode of each first PDU session, to select the second PDU session. For example, if the UE determines, based on a DNN of a PDU session, that a network access manner used for the PDU session is the internet, the PDU session is a PDU session that is uncertain whether to support transfer from the 5G communications system to the 4G communications system. If an SSC mode of the PDU session is an SSC mode 2, the UE further determines that the PDU session is a PDU session that does not support transfer from the 5G communications system to the 4G communications system. For another example, if an SSC mode of a PDU session is an SSC mode 1, the PDU session is a PDU session that is uncertain whether to support transfer from the 5G communications system to the 4G communications system. If the UE determines, based on a DNN of the PDU session, that a network access manner used for the PDU session is the IMS, the UE determines that the PDU session is a PDU session that is certain to support transfer from the 5G communications system to the 4G communications system. It should be understood that the examples are merely intended to prove implementability of this solution.

It should be understood that the UE may alternatively select the at least one second PDU session from the at least one first PDU session based on other information in the description information of the PDU session. Examples are not provided one by one herein. All the first PDU sessions established by the UE are classified based on the description information that is of each first PDU session and that is stored on the UE, to determine the second PDU session. The UE may complete an operation of selecting the second PDU session from the first PDU session by fully using the information stored on the terminal, thereby avoiding causing an additional burden on a network side device, and improving an implementation possibility of this solution.

In this embodiment of this application, because the second PDU session may include a data connection channel that is certain to support transfer from the first communications system to the second communications system, and/or a data connection channel that is uncertain whether to support transfer from the first communications system to the second communications system, a process in which the UE selects the second PDU session from the first PDU session may include a process in which the UE selects at least one third PDU session from the at least one first PDU session. The third PDU session is included in the second PDU session, and is a PDU session that is certain to support transfer from the 5G communications system to the 4G communications system.

Specifically, a manner in which the UE selects a third PDU session from the first PDU session includes but is not limited to any one or a combination of a plurality of the following items: The UE selects the third PDU session from the first PDU session, where the third PDU session includes a data connection channel through which the UE has received information from the 4G communications system during data connection channel establishment. Alternatively, the UE selects the third PDU session from the first PDU session, where the third PDU session includes a data connection channel transferred from the 4G communications system to the 5G communications system.

In some embodiments of this application, if the UE has received, in a process of establishing the third PDU session, information sent by a core network entity in the 4G communications system, the UE may consider that the third PDU session is a PDU session that is certain to support transfer from the 5G communications system to the 4G communications system, so that the UE can select the third PDU session from the first PDU session based on a historical message that is received in a PDU session establishment process and that is sent by the core network entity. For example, if the UE receives, in a process of establishing a PDU session, information sent by an SMF+PGW-C, the UE determines that the PDU session is a PDU session that supports transfer from the 5G communications system to the 4G communications system. It should be understood that the example herein is merely intended to facilitate understanding of this solution, and sets no limitation.

In some other embodiments of this application, for a PDU session that supports transfer from the 5G communications system to the 4G communications system, there is definitely a PDN connection that supports transfer from the 4G communications system to the 5G communications system and that corresponds to the PDU session. For a PDN connection that supports transfer from the 4G communications system to the 5G communications system, there is definitely a PDU session that supports transfer from the 5G communications system to the 4G communications system and that corresponds to the PDN connection. That is, if the third PDU session is transferred from the 4G communications system to the 5G communications system, the third PDU session can also be definitely transferred from the 5G communications system to the 4G communications system. Therefore, the UE can select, from the first PDU session, a PDU session transferred from the 4G communications system. The PDU session is definitely the third PDU session that supports transfer from the 5G communications system to the 4G communications system.

In this embodiment of this application, in a PDU session creation process, the PDU session by which a message has been received from the 4G communications system is determined as a PDU session that supports transfer from the 5G communications system to the 4G communications system, and/or the PDU session transferred from the 4G communications system is determined as a PDU session that supports transfer from the 5G communications system to the 4G communications system. In the foregoing two determining manners, it may be ensured that a selected PDU session is definitely the PDU session that supports transfer from the 5G communications system to the 4G communications system, thereby improving accuracy of a determining process. In addition, a determining basis is a historical message received by the UE, so that the solution is simple and easy to operate.

In this embodiment of this application, when the UE determines the second PDU session from the first PDU session, the foregoing manner of determining the third PDU session from the first PDU session may be used, to improve accuracy of selecting the second PDU session.

303. When the second PDU session includes at least two PDU sessions, the UE prioritizes the at least two second PDU sessions.

In this embodiment of this application, when the second PDU session includes at least two PDU sessions, the UE may prioritize the at least two second PDU sessions in different manners. Specifically, the UE may perform prioritization based on whether the second PDU session is certain to support transfer from the 5G communications system to the 4G communications system. Because each second PDU session is used by at least one app, the UE may further perform prioritization based on a delay requirement of the app that uses the second PDU session. The following separately describes the foregoing two sorting manners in detail.

A. Prioritization is performed based on whether the second PDU session is certain to support transfer from the 5G communications system to the 4G communications system.

Figure 4:
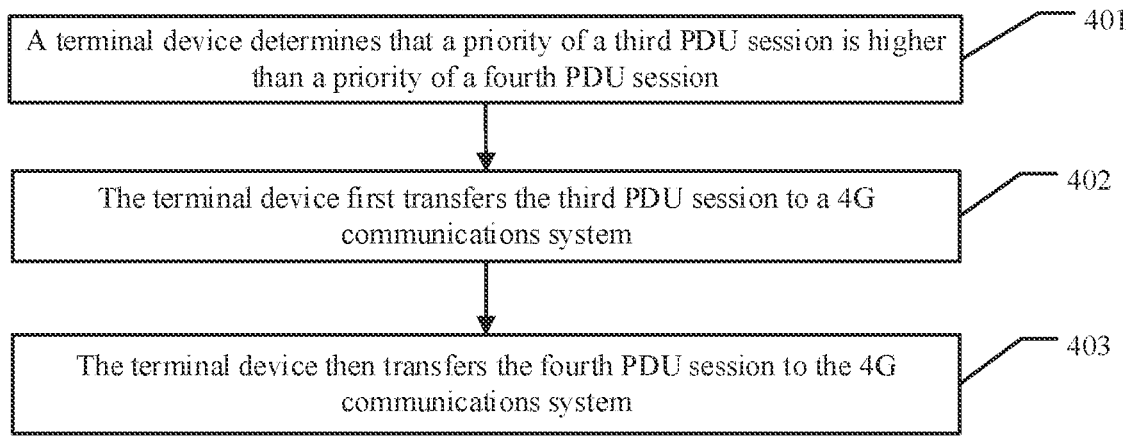
FIG. 4 is a schematic flowchart of transferring at least two selected second PDU sessions to a 4G communications system by a terminal device according to an embodiment of this application.

FIG. 4 is a schematic flowchart of transferring at least two selected second PDU sessions to a 4G communications system by UE according to an embodiment of this application. An implementation in which the UE prioritizes the at least two second PDU sessions may be included, and may be specifically as follows:

401. The UE determines that a priority of a third PDU session is higher than a priority of a fourth PDU session.

In this embodiment of this application, both the third PDU session and the fourth PDU session are included in the second PDU session. The third PDU session is a PDU session that is certain to support transfer from the 5G communications system to the 4G communications system. The fourth PDU session is a PDU session that is uncertain whether to support transfer from the 5G communications system to the 4G communications system. When the second PDU session includes both at least one third PDU session and at least one fourth PDU session, a priority of the third PDU session is higher than a priority of the fourth PDU session. Certainly, when the second PDU session includes only the third PDU session or the fourth PDU session, the foregoing requirement of performing prioritization based on whether the second PDU session is certain to support transfer from the 5G communications system to the 4G communications system does not exist.

Optionally, when at least two PDU sessions exist in the third PDU session, the UE may further sort the at least two third PDU sessions. Specifically, because each third PDU session in the at least two third PDU sessions is used by at least one app, the UE may determine that a priority of a PDU session that is used by an app with a high delay requirement and that is in the third PDU session is higher than a priority of a PDU session used by an app with a low delay requirement.

When at least two PDU sessions exist in the fourth PDU session, the UE may further sort the at least two fourth PDU sessions. Specifically, because each fourth PDU session in the at least two fourth PDU sessions is used by at least one app, the UE may determine that a priority of a PDU session that is used by an app with a high delay requirement and that is in the fourth PDU session is higher than a priority of a PDU session used by an app with a low delay requirement.

Specifically, "an app uses a PDU session" mentioned in this embodiment and subsequent embodiments means that data of the app is transmitted by using the PDU session. More specifically, the two concepts of the app with the high delay requirement and the app with the low delay requirement that are mentioned in this embodiment and subsequent embodiments are not absolute concepts, but are relative concepts. For example, a delay requirement of an app running in the foreground is higher than a delay requirement of an app running in the background. For another example, a delay requirement of a real-time battle-type app is higher than a delay requirement of a message-type app. The examples are merely intended to facilitate understanding of this solution, and other cases are not described by using examples one by one herein.

Next, a specific implementation of step 401 is described by using an example. For example, a PDU session-1 and a PDU session-2 are certain to support transfer from the 5G communications system to the 4G communications system A PDU session-3 and a PDU session-4 are uncertain whether to support transfer from the 5G communication system to the 4G communication system. An app-1 and an app-3 are real-time battle game-type apps, and an app-2 and an app-4 are message-type apps. The app-1 uses the PDU session-1, the app-2 uses the PDU session-2, the app-3 uses the PDU session-3, and the app-4 uses the PDU session-4. In this case, a final sorting result is the PDU session-1, the PDU session-2, the PDU session-3, and the PDU session-4. It should be understood that the example herein is merely intended to facilitate understanding of this solution, and sets no limitation.

In this application, the at least two second PDU sessions are further sorted based on whether the second PDU session is certain to support transfer from the 5G communications system to the 4G communications system, so that a PDU session that is certain to support transfer from the 5G communications system to the 4G communications system has a highest priority, and is transferred earliest, that is, the PDU session that is transferred earliest can be definitely transferred successfully through handover attach. Therefore, it is ensured that the UE can transmit data in a short time by using the PDU session that is successfully transferred, thereby further shortening a transfer delay of transferring the UE from the 5G communications system to the 4G communications system.

On a basis of the foregoing descriptions, sorting is further performed by using the delay requirement information of the app, so that not only PDU session sorting is more accurate and operability of this solution is improved, but also it is ensured that the PDU session used by the app with the high delay requirement can be preferentially transferred, to provide a smoother service to a user.

B. Prioritization is performed based on the delay requirement of the app that uses the second PDU session.

Figure 5:
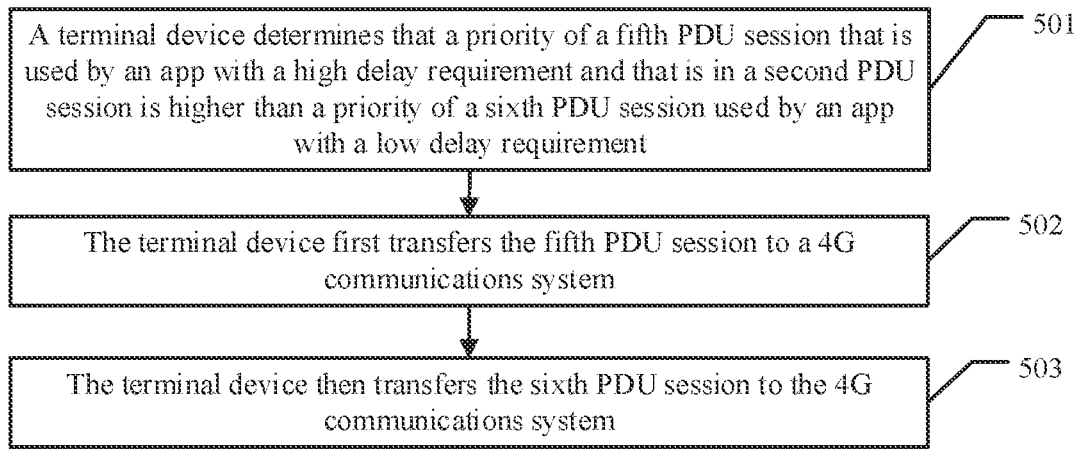
FIG. 5 is another schematic flowchart of transferring at least two selected second PDU sessions to a 4G communications system by a terminal device according to an embodiment of this application.

FIG. 5 is another schematic flowchart of transferring at least two selected second PDU sessions to a 4G communications system by UE according to an embodiment of this application. Another implementation in which the UE prioritizes the at least two second PDU sessions may be included, and may be specifically as follows:

501. The UE determines that a priority of a fifth PDU session that is used by an app with a high delay requirement and that is in the second PDU session is higher than a priority of a sixth PDU session used by an app with a low delay requirement.

In this embodiment of this application, because each second PDU session in the at least two second PDU sessions is used by at least one app, the UE may sort the at least two second PDU sessions based on the delay requirement information of the app that uses the second PDU session. Specifically, the priority of the fifth PDU session used by the app with the high delay requirement is higher than the priority of the sixth PDU session used by the app with the low delay requirement.

Optionally, when at least two PDU sessions exist in the fifth PDU session, the UE may further sort the at least two fifth PDU sessions. Specifically, when the at least two fifth PDU sessions include both a PDU session that is certain to support transfer from the 5G communications system to the 4G communications system and a PDU session that is uncertain whether to support transfer from the 5G communications system to the 4G communications system, the UE may determine that a priority of the PDU session that is in the fifth PDU session and that is certain to support transfer from the 5G communications system to the 4G communications system is higher than a priority of the PDU session that is uncertain whether to support transfer from the 5G communications system to the 4G communications system.

When at least two PDU sessions exist in the sixth PDU session, the UE may further sort the at least two sixth PDU sessions. Specifically, when the at least two sixth PDU sessions include both a PDU session that is certain to support transfer from the 5G communications system to the 4G communications system and a PDU session that is uncertain whether to support transfer from the 5G communications system to the 4G communications system, the UE may determine that a priority of the PDU session that is in the sixth PDU session and that is certain to support transfer from the 5G communications system to the 4G communications system is higher than a priority of the PDU session that is uncertain whether to support transfer from the 5G communications system to the 4G communications system.

Next, a specific implementation of step 501 is described by using an example. For example, a PDU session-1 and a PDU session-2 support transfer from the 5G communications system to the 4G communications system. A PDU session-3 and a PDU session-4 are uncertain whether to support transfer from the 5G communication system to the 4G communication system. An app-1 and an app-3 are real-time battle game-type apps, and an app-2 and an app-4 are message-type apps. The app-1 uses the PDU session-1, the app-2 uses the PDU session-2, the app-3 uses the PDU session-3, and the app-4 uses the PDU session-4. In this case, a final sorting result is the PDU session-1, the PDU session-3, the PDU session-2, and the PDU session-4. It should be understood that the example herein is merely intended to facilitate understanding of this solution, and sets no limitation.

In this embodiment of this application, because the app with the high delay requirement is usually an app that is easily perceived by a user, the at least two second PDU sessions are sorted by using the delay requirement information of the app. Therefore, it is ensured that the PDU session used by the app with the high delay requirement can be preferentially transferred, thereby avoiding poor experience brought to the user because the UE is transferred between communications systems, to provide a better service.

The fifth PDU session and the sixth PDU session may be further respectively sorted based on whether the PDU session is certain to support transfer from the 5G communications system to the 4G communications system, so that a transfer operation can be preferentially performed on the PDU session that is certain to support transfer from the 5G communications system to the 4G communications system, to improve a success rate of a PDU session transfer operation in an early stage. Therefore, the UE can transmit data by using a PDU session (namely, an established PDN connection), as early as possible, that is successfully transferred.

In this embodiment of this application, the processor of the UE may include a modem processor and an application processor. The application processor mainly processes an operating system, a user interface, an application program, and the like. The modem processor mainly processes wireless communication. That is, the application processor manages a correspondence between a PDU session and an app, and the modem is responsible for determining whether each PDU session in the at least one first PDU session supports transfer from the 5G communications system to the 4G communications system. In this case, step 303 may be jointly performed by the modem processor and the application processor. Specifically, the modem processor may prioritize the at least two second PDU sessions, or the application processor may prioritize the at least two second PDU sessions. The following separately describes the foregoing two manners in detail.

1. The modem processor prioritizes the at least two second PDU sessions.

Figure 6:
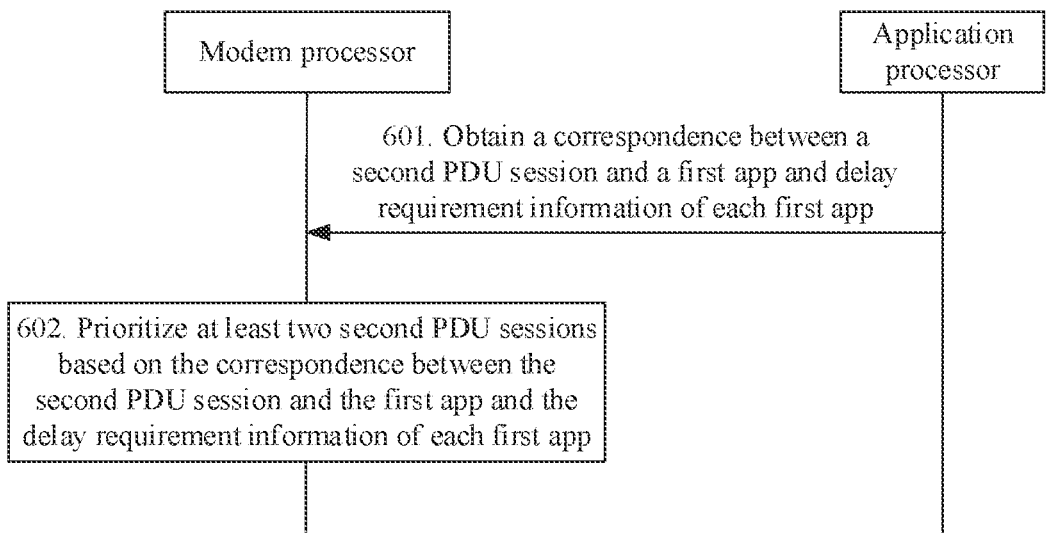
FIG. 6 is a schematic flowchart of prioritizing at least two second PDU sessions according to an embodiment of this application.

FIG. 6 is a schematic flowchart of prioritizing at least two second PDU sessions according to an embodiment of this application. The following steps may be specifically included.

601. The modem processor obtains a correspondence between the second PDU session and a first app and delay requirement information of each first app from the application processor.

In this embodiment of this application, the application processor may store the correspondence between the second PDU session and the first app by using a correspondence table. For example, each piece of data in the correspondence table includes an identifier of one second PDU session and an identifier of at least one first app that uses the second PDU session. Alternatively, the application processor may store the correspondence between the second PDU session and the first app by creating several indexes. Alternatively, the application processor may store the correspondence between the second PDU session and the first app in another manner. Details are not listed one by one herein.

The delay requirement information of the first app includes but is not limited to an app type of the first app or a running location of the first app. Specifically, for example, the first app is a real-time battle-type app or a message-type app. For example, the first app runs in the foreground or runs in the background.

In an implementation, the modem processor and the application processor are two independent chips in terms of hardware, and step 601 may be specifically as follows: After receiving a data obtaining request of the modem processor by using an interface inside the UE, the application processor transmits the correspondence between the second PDU session and the first app and the delay requirement information of each first app to the modem processor.

In another implementation, the modem processor and the application processor are integrated into a same chip (for example, a main processor) in terms of hardware, and step 601 may be specifically as follows: The modem processor directly obtains the correspondence between the second PDU session and the first app and the delay requirement information of each first app.

602. The modem processor prioritizes the at least two second PDU sessions based on the correspondence between the second PDU session and the first app and the delay requirement information of each first app.

In this embodiment of this application, the modem processor may perform step 401 or step 501 based on the correspondence between the second PDU session and the first app and the delay requirement information of each first app, to complete prioritization of the at least two second PDU sessions.

In this embodiment of this application, after obtaining the correspondence and the delay requirement information of the first app, the modem processor may prioritize the at least two second PDU sessions in a timely manner, thereby improving a speed of a process of prioritizing the at least two second PDU sessions.

2. The application processor prioritizes the at least two second PDU sessions.

Figure 7:
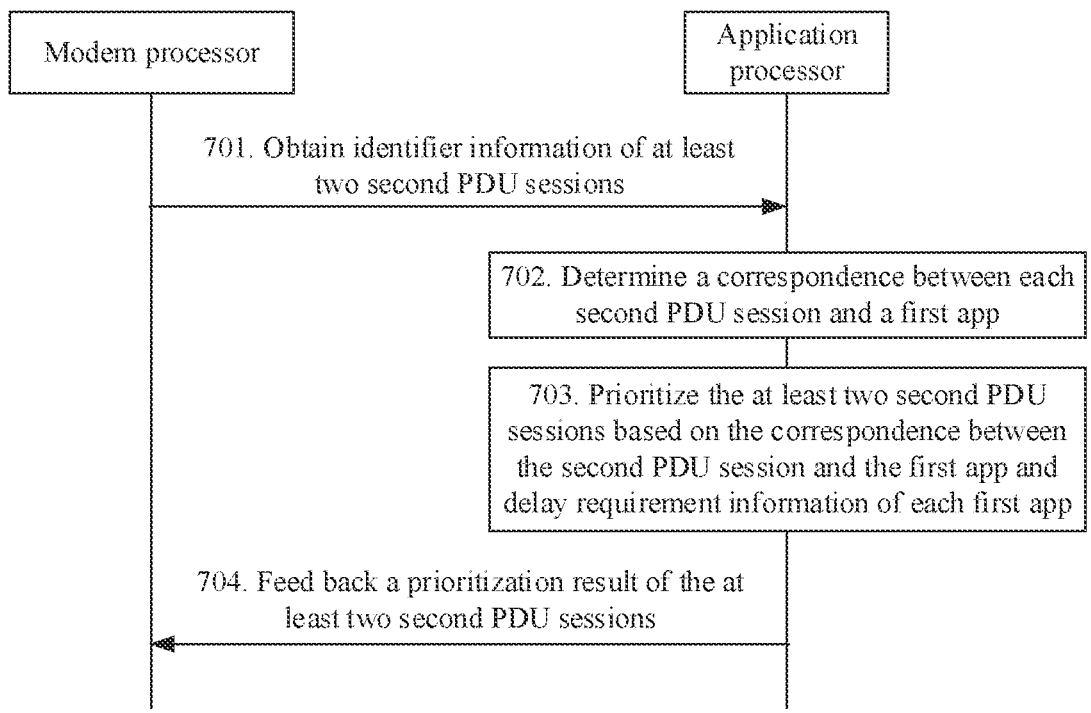
FIG. 7 is another schematic flowchart of prioritizing at least two second PDU sessions according to an embodiment of this application.

FIG. 7 is another schematic flowchart of prioritizing at least two second PDU sessions according to an embodiment of this application. The following steps may be specifically included.

701. The application processor obtains identifier information of the at least two second PDU sessions from the modem processor.

In this embodiment of this application, the application processor may obtain the identifier information of the at least two second PDU sessions from the modem processor. Optionally, the application processor may further obtain classification information of the second PDU session from the modem processor. Specifically, the application processor may determine which of the second PDU session is a third PDU session that is certain to support transfer from the 5G communications system to the 4G communications system and which of the second PDU session is a fourth PDU session that is uncertain whether to support transfer from the 5G communications system to the 4G communications system.

In an implementation, the modem processor and the application processor are two independent chips in terms of hardware, and step 701 may be specifically as follows: The modem processor actively sends the identifier information of the at least two second PDU sessions to the application processor by using an interface inside the UE. Further, the modem processor may further actively send the type information of each second PDU session of the at least two second PDU sessions to the application processor.

In another implementation, the modem processor and the application processor are integrated into a same chip (for example, a main processor) in terms of hardware, and step 701 may be specifically as follows: The application processor directly obtains the identifier information of the second PDU session. Further, the application processor may further actively obtain the type information of each second PDU session, to determine which of the at least two second PDU sessions is a third PDU session that is certain to support transfer from the 5G communications system to the 4G communications system and which of the at least two second PDU sessions is a fourth PDU session that is uncertain whether to support transfer from the 5G communications system to the 4G communications system.

702. The application processor determines a correspondence between each second PDU session and a first app.

In this embodiment of this application, a correspondence between all the first PDU sessions and apps that use the first PDU sessions is pre-stored on the application processor. After obtaining the identifier information of the second PDU session, the application processor may determine the second PDU session, to determine the correspondence between each second PDU session and the first app.

703. The application processor prioritizes the at least two second PDU sessions based on the correspondence between the second PDU session and the first app and delay requirement information of each first app, to obtain a prioritization result of the at least two second PDU sessions.

In this embodiment of this application, the application processor may specifically prioritize the at least two second PDU sessions by performing step 401 or step 501, to obtain the prioritization result of the at least two second PDU sessions.

704. The application processor feeds back the prioritization result of the at least two second PDU sessions to the modem processor.

In an implementation, the modem processor and the application processor are two independent chips in terms of hardware, and step 704 may be specifically as follows: The modem processor sends the prioritization result of the at least two second PDU sessions to the application processor by using an interface inside the UE.

In another implementation, the modem processor and the application processor are integrated into a same chip (for example, a main processor) in terms of hardware, and step

704 may be specifically as follows: The application processor writes the prioritization result of the at least two second PDU sessions into the memory of the UE, and the modem processor directly reads the prioritization result of the at least two second PDU sessions from the memory.

It should be understood that the interface mentioned in the embodiments described in FIG. 6 and FIG. 7 may be an interface preset by the UE, or an interface that is used for data communication between the modem processor and the application processor and that is newly added to the UE. This is not specifically limited herein.

In this embodiment of this application, after determining which PDU session is included in the second PDU session, the application processor prioritizes the at least two second PDU sessions, so that the modem processor does not need to know the correspondence between the second PDU session and the first app, thereby reducing processing load of the modem processor.

304. The UE transfers the at least two second PDU sessions to the 4G communications system based on the prioritization result.

In this embodiment of this application, after obtaining the prioritization result of the at least two second PDU sessions, the UE may transfer a plurality of second PDU sessions included in the at least two second PDU sessions from the 5G communications system to the 4G communications system one by one based on the prioritization result. A PDU session with a higher priority is transferred earlier from the 5G communications system to the 4G communications system by the UE. Because data connection channels are transferred to the second communications system one by one, the at least two second data connection channels are prioritized, to ensure that a data connection channel with a higher priority can be transferred earlier to the second communications system by the terminal device, so that the terminal device can perform prioritization based on use statuses of the data connection channels, thereby improving flexibility of a data connection channel transfer process.

In some embodiments of this application, if the UE prioritizes the at least two second PDU sessions in the manner in step 401, still referring to FIG. 4, because the priority of the third PDU session is higher than the priority of the fourth PDU session, step 304 may specifically include the following steps:

402. The UE first transfers the third PDU session to the 4G communications system.

Optionally, when at least two PDU sessions exist in the third PDU session, because each third PDU session in the at least two third PDU sessions is used by at least one app, if the UE further sorts the at least two third PDU sessions based on the delay requirement information of the app in step 401, step 402 may specifically include: The modem processor of the UE first transfers, to the 4G communications system, the PDU session that is used by the app with the high delay requirement and that is in the third PDU session, and then transfers, to the 4G communications system, the PDU session that is used by the app with the low delay requirement and that is in the third PDU session.

403. The UE then transfers the fourth PDU session to the 4G communications system.

Optionally, similar to step 403, if the UE further sorts the at least two fourth PDU sessions based on the delay requirement information of the app in step 401, step 403 may specifically include: The modem processor of the UE first transfers, to the 4G communications system, the PDU session that is used by the app with the high delay requirement and that is in the fourth PDU session, and then transfers, to the 4G communications system, the PDU session that is used by the app with the low delay requirement and that is in the fourth PDU session.

In some other embodiments of this application, if the UE prioritizes the at least two second PDU sessions in the manner in step 501, still referring to FIG. 5, because the priority of the fifth PDU session is higher than the priority of the sixth PDU session, step 304 may specifically include the following steps:

502. The UE first transfers the fifth PDU session to the 4G communications system.

Optionally, when at least two PDU sessions exist in the fifth PDU session, and the at least two fifth PDU sessions include both a PDU session that is certain to support transfer from the 5G communications system to the 4G communications system and a PDU session that is uncertain whether to support transfer from the 5G communications system to the 4G communications system, if the UE further sorts the at least two fifth PDU sessions based on whether to support transfer from the 5G communications system to the 4G communications system in step 501, step 502 may specifically include: The modem processor of the UE may first transfer, to the 4G communications system, the PDU session that is in the fifth PDU session and that is certain to support transfer from the 5G communications system to the 4G communications system, and then transfer, to the 4G communications system, the PDU session that is in the fifth PDU session and that is uncertain whether to support transfer from the 5G communications system to the 4G communications system.

503. The UE then transfers the sixth PDU session to the 4G communications system.

Optionally, similar to step 503, if the UE further sorts the at least two sixth PDU sessions based on whether to support transfer from the 5G communications system to the 4G communications system in step 501, step 503 may specifically include: The modem processor of the UE may first transfer, to the 4G communications system, the PDU session that is in the sixth PDU session and that is certain to support transfer from the 5G communications system to the 4G communications system, and then transfer, to the 4G communications system, the PDU session that is in the sixth PDU session and that is uncertain whether to support transfer from the 5G communications system to the 4G communications system.

In this embodiment of this application, the modem processor of the UE may transfer a PDU session from the 5G communications system to the 4G communications system by sending an attach message or a PDN connection establishment request to an MME. Specifically, if the PDU session is a PDU session that is to be transferred first, the UE sends an attach message to the MME. The attach message carries at least an attach handover (handover attach) instruction, an APN corresponding to a DNN of the PDU session, and identifier information of the PDU session. If the PDU session is not a PDU session that is to be transferred first, the UE sends a PDN connection establishment request to the MME. The PDN connection establishment request carries at least a handover (handover) instruction, an APN corresponding to a DNN of the PDU session, and identifier information of the PDU session, to establish a PDN connection corresponding to the PDU session in the 4G communications system. It should be understood that after determining a to-be-transferred target second PDU session, the UE may transfer the target second PDU session from the 5G communications system to the 4G communications system. A process in which the modem processor of the UE transfers the at least one second PDU session from the 5G communications system to the 4G communications system is similar to that in the prior art, and details are not described herein again.

305. When the UE determines that a seventh PDU session exists in the first PDU session, the UE does not transfer the seventh PDU session to the 4G communications system.

In this embodiment of this application, after selecting the at least one second PDU session from at least one first PDU session by using step 302, the UE may determine whether the seventh PDU session that is certain not to support transfer from the 5G communications system to the 4G communications system exists in the first PDU session. When the UE determines that the seventh PDU session exists in the first PDU session, and the UE is transferred from the 5G communications system to the 4G communications system, the UE does not transfer the seventh PDU session to the 4G communications system. Because a session transfer operation on the seventh PDU session definitely fails, either re-establishing a PDN connection in the 4G communications system through initial attach or binding a second app that uses the seventh PDU session to a PDU session that has been transferred to the 4G communications system avoids a time wasted because the session transfer operation fails, thereby further shortening a transfer delay of transferring the UE from the 5G communications system to the 4G communications system.

306. The UE obtains at least one second app that uses the seventh PDU session.

In this embodiment of this application, after determining the seventh PDU session from the at least one first PDU session, the UE may obtain the at least one second app whose data is transmitted by using the seventh PDU session. Specifically, the modem processor of the UE may obtain a correspondence between the seventh PDU session and the second app from the application processor.

307. The UE determines a correspondence between the second app and a PDU session that has been transferred to the 4G communications system.

In this embodiment of this application, because the UE does not transfer the seventh PDU session to the 4G communications system, the UE may establish the correspondence between the second app and the PDU session (namely, a PDN connection) that has been transferred to the 4G communications system, that is, establish a correspondence between the second app and an established PDN connection, to transmit data by using the established PDN connection. The at least one second app that uses the seventh PDU session is directly bound to the PDU session that has been transferred to the 4G communications system, to transmit data by using the established PDN connection, thereby omitting a process in which the UE establishes a PDN connection in the 4G communications system through initial attach, and further shortening a transfer delay of transferring the UE from the 5G communications system to the 4G communications system.

It should be understood that step 306 and step 307 are optional steps. If step 306 and step 307 are not performed, the UE may also establish at least one PDN connection corresponding to the at least one seventh PDU session in the 4G communications system through initial attach.

2. The UE is transferred from the 4G communications system to the 5G communications system.

Figure 8:
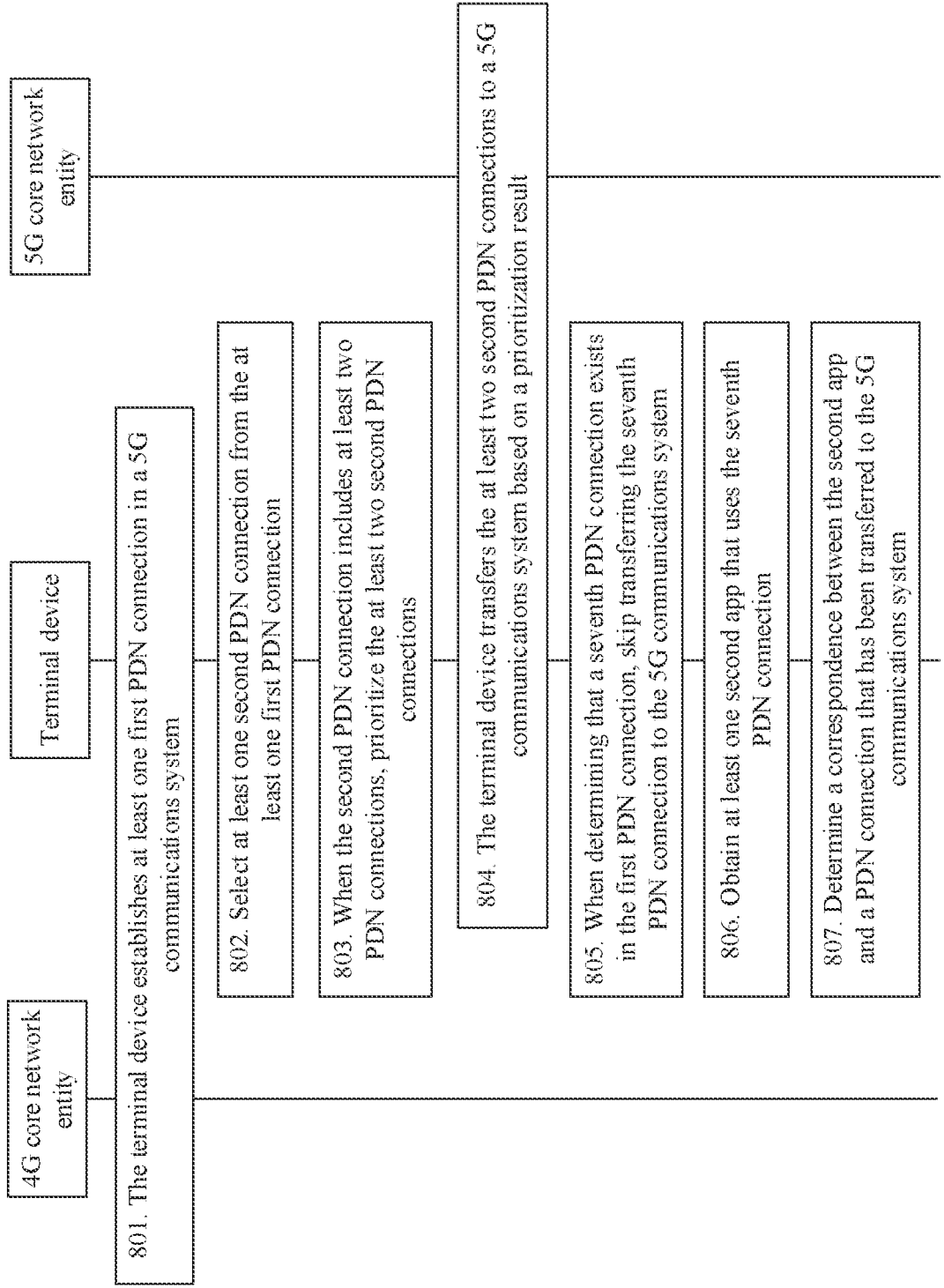
FIG. 8 is another schematic flowchart of a method for transfer between communications systems according to an embodiment of this application.

FIG. 8 is another schematic flowchart of a method for transfer between communications systems according to an embodiment of this application. The method may include the following steps.

801. The UE establishes at least one first PDN connection in the 4G communications system.

802. The UE selects at least one second PDN connection from the at least one first PDN connection.

803. When the second PDN connection includes at least two PDN connections, the UE prioritizes the at least two second PDN connections.

804. The UE transfers the at least two second PDN connections to the 5G communications system based on a prioritization result.

805. When the UE determines that a seventh PDN connection exists in the first PDN connection, and the UE is transferred from the 4G communications system to the 5G communications system, the UE does not transfer the seventh PDN connection to the 5G communications system.

806. The UE obtains at least one second app that uses the seventh PDN connection.

807. The UE determines a correspondence between the second app and a PDN connection that has been transferred to the 5G communications system.

It should be understood that step 801 to step 807 are similar to step 301 to step 306 in the embodiment described in FIG. 3. A difference lies in the following: In step 301 to step 306, the UE is transferred from the 5G communications system to the 4G communications system, that is, transfers a PDU session established in the 5G communications system to the 4G communications system, to establish a corresponding PDN connection in the 4G communications system. In step 801 to step 807, the UE is transferred from the 4G communications system to the 5G communications system, that is, transfers a PDN connection established in the 4G communications system to the 5G communications system, to establish a corresponding PDU session in the 5G communications system.

Therefore, when step 801 to step 807 are performed, the 5G communications system in step 301 to step 306 needs to be replaced with the 4G communications system, the 4G communications system in step 301 to step 306 needs to be replaced with the 5G communications system, the PDU session in step 301 to step 306 needs to be replaced with the PDN connection, and the PDN connection in step 301 to step 306 needs to be replaced with the PDU session.

In addition, a specific implementation process of step 802 is slightly different from that of step 302 in the embodiment described in FIG. 3. Specifically, the UE may determine the network access manner of the PDU session based on the DNN of the PDU session in step 302. When step 802 is performed, the foregoing description needs to be replaced with the following: The UE may determine a network access manner of the PDN connection based on an access point name (access point name, APN) of the PDN connection.

A specific implementation process of step 804 is slightly different from that of step 304 in the embodiment described in FIG. 3. Specifically, in step 304, the UE sends, to the MME, the attach message that carries the attach handover instruction, the APN corresponding to the DNN of the PDU session, and the identifier information of the PDU session, to trigger a transfer operation of transferring the PDU session from the 5G communications system to the 4G communications system. When step 804 is performed, the foregoing description needs to be replaced with the following: The UE sends, to an AMF, a handover request message that carries an existing PDU session message, a DNN corresponding to the APN of the PDN connection, and identifier information of the PDN connection, to trigger a transfer operation of transferring the PDN connection from the 4G communications system to the 5G communications system. However, it should be understood that a process in which the UE transfers the at least one second PDN connection from the 4G communications system to the 5G communications system is similar to that in the prior art.

In this embodiment of this application, not only a specific implementation solution for transfer from the 5G communications system to the 4G communications system is provided, but also a specific implementation solution for transfer from the 4G communications system to the 5G communications system is provided, thereby expanding an implementation scenario of this solution, and improving comprehensiveness of this solution.

To better implement the foregoing solution of the embodiments of this application, the following further provides a related apparatus for implementing the foregoing solution.

Figure 9:
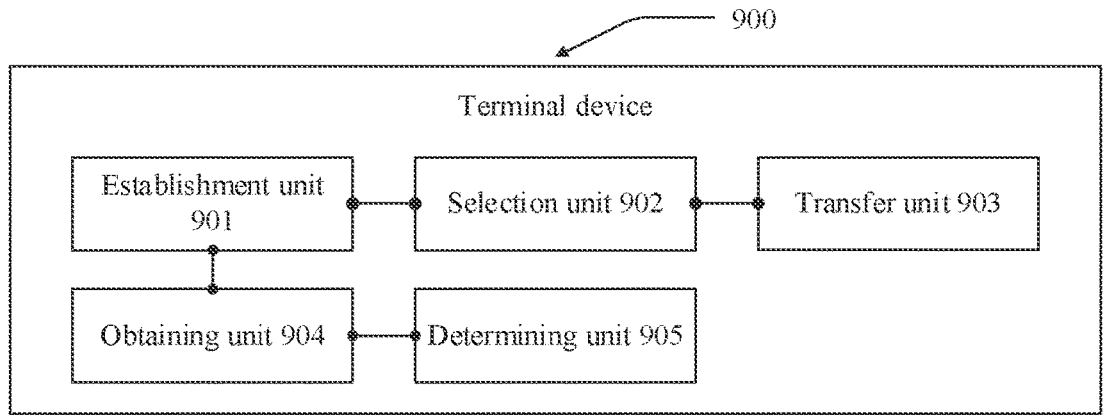
FIG. 9 is another schematic structural diagram of a terminal device according to an embodiment of this application.

Specifically, FIG. 9 is a schematic structural diagram of a terminal device according to an embodiment of this application. The terminal device includes an establishment unit 901, a selection unit 902, and a transfer unit 903.

The establishment unit 901 is configured to establish at least one first data connection channel in a first communications system.

The selection unit 902 is configured to select at least one second data connection channel from the at least one first data connection channel, where the second data connection channel is included in the first data connection channel, is a data connection channel that is certain to support transfer from the first communications system to a second communications system, and/or is a data connection channel that is uncertain whether to support transfer from the first communications system to the second communications system.

The transfer unit 903 is configured to: when the terminal device is transferred from the first communications system to the second communications system, preferentially transfer the second data connection channel to the second communications system.

In this embodiment of this application, after obtaining the at least one established first data connection channel, the selection unit 902 determines the second data connection channel from the at least one first data connection channel. The second data connection channel is included in the first data connection channel, is a data connection channel that is certain to support transfer from the first communications system to the second communications system, and/or is a data connection channel that is uncertain whether to support transfer from the first communications system to the second communications system. The transfer unit 903 preferentially transfers a data connection channel that is in the first data connection channel and that is certain to support and/or is uncertain whether to support transfer from the first communications system to the second communications system, that is, delays processing of a data connection channel that is certain not to support transfer between communications systems. Therefore, a transfer delay of a PDU session that supports interworking is shortened, and the UE can also transmit data in a timely manner through a data connection channel that has been transferred to the second communications system, thereby reducing a delay of transferring the UE from a 5G communications system to a 4G communications system.

In a possible design, a manner in which the selection unit 902 selects at least one second data connection channel from the at least one first data connection channel includes any one or a combination of a plurality of the following items:
  selecting the second data connection channel from the first data connection channel based on a network access manner of each first data connection channel, or selecting the second data connection channel from the first data connection channel based on a session and service continuity mode of each first data connection channel.

In a possible design, the selection unit 902 is specifically configured to select, from the first data connection channel, at least one third data connection channel that is certain to support transfer from the first communications system to the second communications system, where the third data connection channel is included in the second data connection channel.

A manner in which the selecting unit 902 selects, from the first data connection channel, a data connection channel that is certain to support transfer from the first communications system to the second communications system includes any one or a combination of a plurality of the following items:
  selecting the third data connection channel from the first data connection channel, where the third data connection channel includes a data connection channel through which the terminal device has received information from the second communications system during data connection channel establishment; or
  selecting the third data connection channel from the first data connection channel, where the third data connection channel includes a data connection channel transferred from the second communications system to the first communications system.

In a possible design, the transfer unit 903 is specifically configured to:
  when the second data connection channel includes at least two data connection channels, prioritize the at least two second data connection channels; and transfer the at least two second data connection channels to the second communications system based on a prioritization result, where a data connection channel with a higher priority is transferred earlier from the first communications system to the second communications system by the terminal device.

In a possible design, the second data connection channel includes at least one third data connection channel and at least one fourth data connection channel, the third data connection channel is a data connection channel that is certain to support transfer from the first communications system to the second communications system, and the fourth data connection channel is a data connection channel that is uncertain whether to support transfer from the first communications system to the second communications system.

The transfer unit 903 is specifically configured to: determine that a priority of the third data connection channel is higher than a priority of the fourth data connection channel; first transfer the third data connection channel to the second communications system; and then transfer the fourth data connection channel to the second communications system.

In a possible design, each data connection channel included in the at least two second data connection channels is used by at least one application program app.

The transfer unit 903 is further configured to: when the third data connection channel includes at least two data connection channels, determine that a priority of a data connection channel that is used by an app with a high delay requirement and that is in the third data connection channel is higher than a priority of a data connection channel used by an app with a low delay requirement; and/or the transfer unit 903 is further configured to: when the fourth data connection channel includes at least two data connection channels, determine that a priority of a data connection channel that is used by an app with a high delay requirement and that is in the fourth data connection channel is higher than a priority of a data connection channel used by an app with a low delay requirement.

In a possible design, each data connection channel included in the at least two second data connection channels is used by at least one application program app.

The transfer unit 903 is specifically configured to: determine that a priority of a fifth data connection channel that is used by an app with a high delay requirement and that is in the second data connection channel is higher than a priority of a sixth data connection channel used by an app with a low delay requirement; first transfer the fifth data connection channel to the second communications system; and then transfer the sixth data connection channel to the second communications system.

In a possible design, the transfer unit 903 is further configured to: when the fifth data connection channel includes at least two data connection channels, determine that a priority of a data connection channel that is in the fifth data connection channel and that is certain to support transfer from the first communications system to the second communications system is higher than a priority of a data connection channel that is uncertain whether to support transfer from the first communications system to the second communications system; and/or the transfer unit 903 is further configured to: when the sixth data connection channel includes at least two data connection channels, determine that a priority of a data connection channel that is in the sixth data connection channel and that is certain to support transfer from the first communications system to the second communications system is higher than a priority of a data connection channel that is uncertain whether to support transfer from the first communications system to the second communications system.

In a possible design, the transfer unit 903 is further configured to: when the terminal device determines that a seventh data connection channel exists in the first data connection channel, and the terminal device is transferred from the first communications system to the second communications system, skip transferring the seventh data connection channel to the second communications system, where the seventh data connection channel is included in the first data connection channel, and is a data connection channel that is certain not to support transfer from the first communications system to the second communications system.

In a possible design, the terminal device further includes an obtaining unit 904 and a determining unit 905.

The obtaining unit 904 is configured to obtain at least one second app that uses the seventh data connection channel.

The determining unit 905 is configured to determine a correspondence between the second app and a data connection channel that has been transferred to the second communications system.

In a possible design, the first communications system is a fourth generation communications network, the second communications system is a fifth generation communications system, and the first data connection channel is a packet data network PDN connection. Alternatively, the first communications system is a fifth generation communications system, the second communications system is a fourth generation communications network, and the first data connection channel is a protocol data unit PDU session.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application, and the details are not described herein again.

Figure 10:
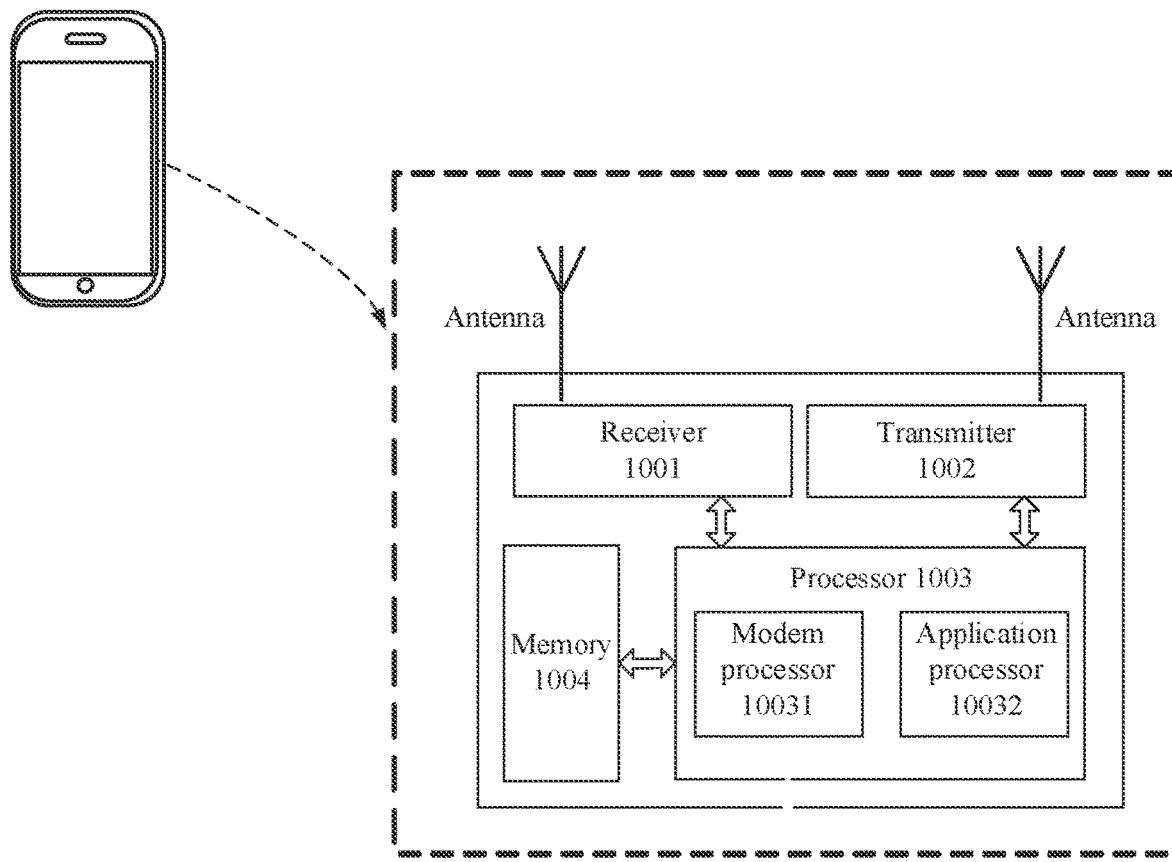
FIG. 10 is still another schematic structural diagram of a terminal device according to an embodiment of this application.

The following describes another terminal device provided in the embodiments of this application. FIG. 10 is a schematic structural diagram of a terminal device according to an embodiment of this application. A terminal device 1000 includes:

a receiver 1001, a transmitter 1002, a processor 1003, and a memory 1004 (there may be one or more processors 1003 in the terminal device 1000, and one processor is used as an example in FIG. 10). The processor 1003 may include a modem processor 10031 and an application processor 10032. In some embodiments of this application, the receiver 1001, the transmitter 1002, the processor 1003, and the memory 1004 may be connected to each other by using a bus or in another manner.

The memory 1004 may include a read-only memory and a random access memory, and provide an instruction and data to the processor 1003. A part of the memory 1004 may further include a non-volatile random access memory (non-volatile random access memory, NVRAM). The memory 1004 stores a processor and operation instruction, an executable module, a data structure, a subset thereof, or an extension set thereof. The operation instruction may include various operation instructions for implementing various operations.

The processor 1003 controls an operation of the terminal device. In a specific application, components of the terminal device are coupled together by using a bus system. In addition to a data bus, the bus system includes a power bus, a control bus, and a status signal bus. However, for clear description, various types of buses in the figure are marked as the bus system.

The method disclosed in the embodiment of this application may be applied to the processor 1003, or implemented by the processor 1003. The processor 1003 may be an integrated circuit chip and has a signal processing capability. In an implementation process, steps in the foregoing methods can be implemented by using a hardware integrated logic circuit in the processor 1003, or by using instructions in a form of software. The processor 1003 may be a general-purpose processor, a digital signal processor (digital signal processor. DSP), an application specific integrated circuit (application specific integrated circuit, ASIC), a field-programmable gate array (field-programmable gate array. FPGA) or another programmable logic device, a discrete gate or transistor logic device, or a discrete hardware component. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1004, and the processor 1003 reads information in the memory 1004 and completes the steps in the foregoing methods in combination with hardware of the processor.

The receiver 1001 may be configured to receive input digital or character information, and generate signal input related to a relevant setting and function control of the terminal device. The transmitter 1002 may be configured to output digital or character information by using a first interface. The transmitter 1002 may be further configured to send an instruction to a disk group by using the first interface, to modify data in the disk group. The transmitter 1002 may further include a display device such as a display screen.

In this embodiment of this application, the processor 1003 is configured to perform the method for transfer between communications systems performed by the terminal device. Specifically, the modem processor 10031 is configured to establish at least one first data connection channel in a first communications system. The modem processor 10031 is further configured to select at least one second data connection channel from the at least one first data connection channel, where the second data connection channel is included in the first data connection channel, is a data connection channel that is certain to support transfer from the first communications system to a second communications system, and/or is a data connection channel that is uncertain whether to support transfer from the first communications system to the second communications system. When the terminal device is transferred from the first communications system to the second communications system, the modem processor 10031 is further configured to preferentially transfer the second data connection channel to the second communications system.

In this embodiment of this application, after obtaining the at least one established first data connection channel, the modem processor 10031 determines the second data connection channel from the at least one first data connection channel. The second data connection channel is included in the first data connection channel, is a data connection channel that is certain to support transfer from the first communications system to the second communications system, and/or is a data connection channel that is uncertain whether to support transfer from the first communications system to the second communications system. The modem processor 10031 preferentially transfers a data connection channel that is in the first data connection channel and that is certain to support and/or is uncertain whether to support transfer from the first communications system to the second communications system, that is, delays processing of a data connection channel that is certain not to support transfer between communications systems. Therefore, a transfer delay of a PDU session that supports interworking is shortened, and the modem processor 10031 can also transmit data in a timely manner through a data connection channel that has been transferred to the second communications system, thereby reducing a delay of transferring the UE from a 5G communications system to a 4G communications system.

In a possible design, a manner in which the modem processor 10031 selects at least one second data connection channel from the at least one first data connection channel specifically includes any one or a combination of a plurality of the following items:

selecting the second data connection channel from the first data connection channel based on a network access manner of each first data connection channel; or selecting the second data connection channel from the first data connection channel based on a session and service continuity mode of each first data connection channel.

In a possible design, the modem processor 10031 is specifically configured to select, from the first data connection channel, at least one third data connection channel that is certain to support transfer from the first communications system to the second communications system, where the third data connection channel is included in the second data connection channel.

A manner in which the modem processor 10031 selects at least one third data connection channel from the first data connection channel specifically includes any one or a combination of a plurality of the following items:

selecting the third data connection channel from the first data connection channel, where the third data connection channel includes a data connection channel through which the terminal device has received information from the second communications system during data connection channel establishment; or selecting the third data connection channel from the first data connection channel, where the third data connection channel includes a data connection channel transferred from the second communications system to the first communications system.

In a possible design, the modem processor 10031 is specifically configured to: when the second data connection channel includes at least two data connection channels, prioritize the at least two second data connection channels; and transfer the at least two second data connection channels to the second communications system based on a prioritization result, where a data connection channel with a higher priority is transferred earlier from the first communications system to the second communications system by the modem processor 10031.

In a possible design, the second data connection channel includes at least one third data connection channel and at least one fourth data connection channel, the third data connection channel is a data connection channel that is certain to support transfer from the first communications system to the second communications system, and the fourth data connection channel is a data connection channel that is uncertain whether to support transfer from the first communications system to the second communications system.

The modem processor 10031 is specifically configured to: determine that a priority of the third data connection channel is higher than a priority of the fourth data connection channel; first transfer the third data connection channel to the second communications system; and then transfer the fourth data connection channel to the second communications system.

In a possible design, each data connection channel included in the at least two second data connection channels is used by at least one application program app.

When the third data connection channel includes at least two data connection channels, the modem processor 10031 is further configured to determine that a priority of a data connection channel that is used by an app with a high delay requirement and that is in the third data connection channel is higher than a priority of a data connection channel used by an app with a low delay requirement; and/or when the fourth data connection channel includes at least two data connection channels, the modem processor 10031 is further configured to determine that a priority of a data connection channel that is used by an app with a high delay requirement and that is in the fourth data connection channel is higher than a priority of a data connection channel used by an app with a low delay requirement.

In a possible design, each data connection channel included in the at least two second data connection channels is used by at least one application program app.

The modem processor 10031 is specifically configured to: determine that a priority of a fifth data connection channel that is used by an app with a high delay requirement and that is in the second data connection channel is higher than a priority of a sixth data connection channel used by an app with a low delay requirement; first transfer the fifth data connection channel to the second communications system; and then transfer the sixth data connection channel to the second communications system.

In a possible design, when the fifth data connection channel includes at least two data connection channels, the modem processor 10031 is further configured to determine that a priority of a data connection channel that is in the fifth data connection channel and that is certain to support transfer from the first communications system to the second communications system is higher than a priority of a data connection channel that is uncertain whether to support transfer from the first communications system to the second communications system; and/or when the sixth data connection channel includes at least two data connection channels, the modem processor 10031 is further configured to determine that a priority of a data connection channel that is in the sixth data connection channel and that is certain to support transfer from the first communications system to the second communications system is higher than a priority of a data connection channel that is uncertain whether to support transfer from the first communications system to the second communications system.

In a possible design, the processor further includes the application processor 10032, and each data connection channel included in the at least two second data connection channels is used by at least one first app.

The modem processor 10031 is specifically configured to: obtain a correspondence between the second data connection channel and the first app and delay requirement information of each first app from the application processor 10032; and prioritize the at least two second data connection channels based on the correspondence between the second data connection channel and the first app and the delay requirement information of each first app.

In a possible design, the processor further includes the application processor 10032, and each data connection channel included in the at least two second data connection channels is used by at least one first app.

The application processor 10032 is specifically configured to; obtain identifier information of the at least two second data connection channels from the modem processor 10031; determine a correspondence between each second data connection channel and the first app; and prioritize the at least two second data connection channels based on the correspondence between the second data connection channel and the first app and delay requirement information of each first app.

In a possible design, the modem processor 10031 is further configured to: when the modem processor 10031 determines that a seventh data connection channel exists in the first data connection channel, and the terminal device is transferred from the first communications system to the second communications system skip transferring the seventh data connection channel to the second communications system, where the seventh data connection channel is included in the first data connection channel, and is a data connection channel that is certain not to support transfer from the first communications system to the second communications system.

In a possible design, the modem processor 10031 is further configured to: obtain at least one second app that uses the seventh data connection channel, and determine a correspondence between the second app and a data connection channel that has been transferred to the second communications system.

In a possible design, the first communications system is a fourth generation communications network, the second communications system is a fifth generation communications system, and the first data connection channel is a packet data network PDN connection. Alternatively, the first communications system is a fifth generation communications system, the second communications system is a fourth generation communications network, and the first data connection channel is a protocol data unit PDU session.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application, and the details are not described herein again.

The following describes a modem processor provided in an embodiment of this application. The modem processor is specifically an independent modem chip in terms of hardware, and is configured to support a terminal device in implementing functions of the modem processor 10031 in the embodiment described in FIG. 10, for example, processing or sending data and/or information in the foregoing embodiment. In a possible design, the modem chip may further include a memory, configured to store a necessary program instruction and data.

An embodiment of this application further provides a computer program product including an instruction for transfer between communications systems. When the computer program product is run on a computer, the computer is enabled to perform the steps that are performed by the terminal device and that are in the methods described in the embodiments shown in FIG. 3 to FIG. 8.

An embodiment of this application further provides a computer readable storage medium. The computer readable storage medium stores an instruction for transfer between communications systems. When the instruction is run on a computer, the computer is enabled to perform the steps that are performed by the terminal device and that are in the methods described in the embodiments shown in FIG. 3 to FIG. 8.

The processor mentioned anywhere above may be a general-purpose central processing unit, a microprocessor, an ASIC, or one or more integrated circuits for controlling program execution of the method in the first aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium stored by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid State Disk, SSD), or the like.

What is claimed is:

1. A method implemented by a terminal device, wherein the method comprises:
  establishing data connection channels in a first communications system, wherein the data connection channels correspond to a first category of the data connection channels that are certain to support a transfer from the first communications system to a second communications system, a second category of the data connection channels that may or may not support the transfer, or a third category of the data connection channels that will not support the transfer;
  selecting, from among the data connection channels, at least one data connection channel that corresponds to the first category or the second category; and
  preferentially transferring the at least one data connection channel to the second communications system when the terminal device is transferred from the first communications system to the second communications system.

2. The method of claim 1, further comprising:
  further selecting the at least one data connection channel based on a network access manner of each of the data connection channels; or
  further selecting the at least one data connection channel based on a session and service continuity mode of each of the data connection channels.

3. The method of claim 1, further comprising selecting, from the data connection channels, at least one third data connection channel that is certain to support the transfer, wherein the at least one third data connection channel is in the at least one data connection channel, and wherein the at least one third data connection channel comprises either:
  a fourth data connection channel through which the terminal device has received information from the second communications system during data connection channel establishment; or
  a fifth data connection channel transferred from the second communications system to the first communications system.

4. The method of claim 1, further comprising:
  prioritizing at least two second data connection channels when the at least one data connection channel comprises the at least two second data connection channels;
  transferring a first of the at least two second data connection channels to the second communications system; and
  transferring a second of the at least two second data connection channels to the second communications system after transferring the first of the at least two second data connection channels to the second communications system based on a result of the prioritizing indicating that the first of the at least two second data connection channels has a higher priority than a priority of the second of the at least two second data connection channels.

5. The method of claim 4, wherein the at least one data connection channel comprises at least one third data connection channel that corresponds to the first category and at least one fourth data connection channel that corresponds to the third category, and wherein the method further comprises:
  determining that a first priority of the at least one third data connection channel is higher than a second priority of the at least one fourth data connection channel;
  transferring the at least one third data connection channel to the second communications system; and
  transferring the at least one fourth data connection channel to the second communications system after transferring the at least one third data connection channel to the second communications system based on the first priority being higher than the second priority.

6. The method of claim 5, wherein each of the at least two second data connection channels is used by an application program (app), and wherein the method further comprises:

determining that a third priority of a fifth data connection channel that is used by an app with a high delay requirement and that is in the at least one third data connection channel is higher than a fourth priority of a sixth data connection channel used by an app with a low delay requirement and that is in the at least one third data connection channel when the at least one third data connection channel comprises the fifth data connection channel and the sixth data connection channel; and determining that a fifth priority of a seventh data connection channel that is used by an app with the high delay requirement and that is in the at least one fourth data connection channel is higher than a sixth priority of an eighth data connection channel that is used by an app with the low delay requirement and that is in the at least one fourth data connection channel when the at least one fourth data connection channel comprises the seventh data connection channel and the eighth data connection channel.

7. The method of claim 4, wherein each of the at least two second data connection channels is used by an application program (app), and wherein the method further comprises:

determining that a first priority of a third data connection channel that is used by an app with a high delay requirement and that is in the at least one data connection channel is higher than a second priority of a fourth data connection channel that is used by an app with a low delay requirement and that is in the at least one data connection channel;

transferring the third data connection channel to the second communications system; and transferring the fourth data connection channel to the second communications system after transferring the third data connection channel to the second communications system based on the first priority being higher than the second priority.

8. The method of claim 7, further comprising:

determining that a third priority of a fifth data connection channel that is in the third data connection channel and that is certain to support the transfer is higher than a fourth priority of a sixth data connection channel that is in the third data connection channel and that is uncertain whether to support the transfer when the third data connection channel comprises the fifth data connection channel and the sixth data connection channel; and determining that a fifth priority of a seventh data connection channel that is in the fourth data connection channel and that is certain to support the transfer is higher than a sixth priority of an eighth data connection channel that is in the fourth data connection channel and that corresponds to the third category when the fourth data connection channel comprises the seventh data connection channel and the eighth data connection channel.

9. The method of claim 4, wherein each of the at least two second data connection channels is used by a first application program (app), and wherein the method further comprises:

obtaining, by a modem processor of the terminal device from an application processor of the terminal device, correspondences comprising a correspondence between each of the at least one data connection channel and a corresponding first app and delay requirement information of the corresponding first app; and prioritizing the at least two second data connection channels based on the correspondences.

10. The method of claim 4, wherein each of the at least two second data connection channels is used by at least one first application program (app), and wherein the method further comprises:

obtaining, by an application processor of the terminal device, identifier information of the at least two second data connection channels from a modem processor of the terminal device;

determining, by the application processor, correspondences comprising a correspondence between each of the at least one data connection channel and a corresponding first app and delay requirement information of each of the corresponding first app; and prioritizing, by the application processor, the at least two second data connection channels based on the correspondences.

11. The method of claim 1, further comprising:

determining that the data connection channels comprise a third data connection channel that is certain not to support the transfer; and skipping transferring the third data connection channel to the second communications system when the terminal device is transferred from the first communications system to the second communications system.

12. The method of claim 11, further comprising:

obtaining a first application program (app) that uses the third data connection channel; and determining a correspondence between the first app and a fourth data connection channel that has been transferred to the second communications system.

13. The method of claim 1, wherein either:

the first communications system is a fourth generation communications network, the second communications system is a fifth generation communications system, and the data connection channels correspond to a packet data network (PDN) connection; or the first communications system is the fifth generation communications system, the second communications system is the fourth generation communications network, and the first data connection channels correspond to a protocol data unit (PDU) session.

14. A terminal device comprising:

a memory configured to store instructions; and a modem processor coupled to the memory, wherein the instructions cause the terminal device to be configured to:

establish data connection channels in a first communications system, wherein the data connection channels correspond to a first category of the data connection channels that are certain to support a transfer from the first communications system to a second communications system, a second category of the data connection channels that may or may not support the transfer, or a third category of the data connection channels that will not support the transfer;

select, from among the data connection channels, at least one data connection channel that corresponds to the first category or the second category; and preferentially transfer the at least one data connection channel to the second communications system when the terminal device is transferred from the first communications system to the second communications system.

15. The terminal device of claim 14, wherein the instructions further cause the terminal device to be configured to:
further select the at least one data connection channel based on a network access manner of each of the data connection channels; or
further select the at least one data connection channel from the data connection channels based on a session and service continuity mode of each of the data connection channels.

16. The terminal device of claim 14, wherein the instructions further cause the terminal device to be configured to select, from the data connection channels, at least one third data connection channel that is certain to support the transfer, wherein the at least one third data connection channel is in the at least one data connection channel, and wherein the at least one third data connection channel comprises either:
a fourth data connection channel through which the terminal device has received information from the second communications system during data connection channel establishment; or
a fifth data connection channel transferred from the second communications system to the first communications system.

17. The terminal device of claim 14, wherein the instructions further cause the terminal device to be configured to:
prioritize at least two second data connection channels when the at least one data connection channel comprises the at least two second data connection channels;
transfer a first of the at least two second data connection channels to the second communications system the first of the at least two second data connection channels; and
transfer a second of the at least two second data connection channels to the second communications system after transferring the first of the at least two second data connection channels to the second communications system based on a result of the prioritizing indicating that the first of the at least two second data connection channels has a higher priority than a priority of the second of the at least two second data connection channels.

18. The terminal device of claim 17, wherein the at least one data connection channel comprises at least one third data connection channel that is certain to support the transfer and at least one fourth data connection channel that corresponds to the third category, and wherein the instructions further cause the terminal device to be configured to:
determine that a first priority of the at least one third data connection channel is higher than a second priority of the at least one fourth data connection channel;
transfer the at least one third data connection channel to the second communications system; and
transfer the at least one fourth data connection channel to the second communications system after transferring the at least one third data connection channel to the second communications system based on the first priority being higher than the second priority.

19. The terminal device of claim 18, wherein each of the at least two second data connection channels is used by an application program (app), and wherein the instructions further cause the terminal device to be configured to:
determine that a third priority of a fifth data connection channel that is used by an app with a high delay requirement and that is in the at least one third data connection channel is higher than a fourth priority of a sixth data connection channel used by an app with a low delay requirement and that is in the at least one third data connection channel when the at least one third data connection channel comprises the fifth data connection channel and the sixth data connection channel; and
determine that a fifth priority of a seventh data connection channel that is used by an app with the high delay requirement and that is in the at least one fourth data connection channel is higher than a sixth priority of an eighth data connection channel that is used by an app with the low delay requirement and that is in the at least one fourth data connection channel when the at least one fourth data connection channel comprises the seventh data connection channel and the eighth data connection channel.

20. A computer program product comprising computer-executable instructions stored on a non-transitory computer-readable medium when executed by a processor, cause a terminal device to:
establish first data connection channels in a first communications system, wherein the data connection channels correspond to a first category of the data connection channels that are certain to support a transfer from the first communications system to a second communications system, a second category of the data connection channels that may or may not support the transfer, or a third category of the data connection channels that will not support the transfer;
select, from among the data connection channels, at least one data connection channel that corresponds to the first category or the second category; and
preferentially transfer the at least one data connection channel to the second communications system when the terminal device is transferred from the first communications system to the second communications system.

* * * * *